United States Patent [19]

Kutsuwada

[11] Patent Number: 5,600,429
[45] Date of Patent: Feb. 4, 1997

[54] IMAGE COPYING APPARATUS

[75] Inventor: Satoru Kutsuwada, Kawasaki, Japan

[73] Assignee: Canon Kabushiki Kaisha, Tokyo, Japan

[21] Appl. No.: 323,058

[22] Filed: Oct. 14, 1994

Related U.S. Application Data

[63] Continuation of Ser. No. 20,384, Feb. 22, 1993, abandoned.

[30] Foreign Application Priority Data

Feb. 24, 1992 [JP] Japan .................................. 4-036166

[51] Int. Cl.$^6$ ................................................. G03G 21/00
[52] U.S. Cl. ............................ 399/17; 355/24; 358/449; 399/374
[58] Field of Search ....................... 355/311, 202, 355/244, 324, 23, 24, 319, 320; 346/108; 358/444, 448, 449, 451, 452; 270/27, 35; 382/44, 46

[56] References Cited

U.S. PATENT DOCUMENTS

| | | | |
|---|---|---|---|
| 4,579,446 | 4/1986 | Fujino et al. ........................... | 355/24 |
| 4,809,021 | 2/1989 | Check et al. ........................... | 346/108 |
| 4,876,562 | 10/1989 | Suzuki et al. .......................... | 346/160 |
| 5,038,218 | 8/1991 | Matsumoto ........................... | 358/444 X |
| 5,105,230 | 4/1992 | Emori .................................... | 355/319 |
| 5,220,431 | 6/1993 | Yamagguchi ......................... | 358/449 |
| 5,239,388 | 8/1993 | Matsumoto ........................... | 358/448 |
| 5,301,036 | 4/1994 | Barrett et al. ......................... | 358/448 |
| 5,355,205 | 10/1994 | Toyama et al. ....................... | 355/311 |

FOREIGN PATENT DOCUMENTS

| | | | |
|---|---|---|---|
| 163958 | 9/1983 | Japan .................................... | 355/311 |
| 158266 | 7/1986 | Japan . | |
| 61-262755 | 11/1986 | Japan .................................... | 355/320 |
| 209472 | 9/1987 | Japan .................................... | 355/311 |
| 311268 | 12/1988 | Japan .................................... | 355/318 |

*Primary Examiner*—John E. Barlow, Jr.
*Attorney, Agent, or Firm*—Fitzpatrick, Cella, Harper & Scinto

[57] ABSTRACT

It is determined whether recording paper set in a copying apparatus is oriented sideways or in the lengthwise direction, and it is determined whether an original has been set on a platen sideways or in the lengthwise direction. Based upon these determinations and a designated binding direction in which the recording paper is to be bound, the image read from the original is rotated through a predetermined angle in a two-dimensional plane and the rotated image is then printed out on the recording paper. This makes it possible to perform double-sided copying in a normal manner irrespective of the orientation of the original on the platen.

50 Claims, 26 Drawing Sheets

IMAGE COPYING APPARATUS

This application is a continuation of application Ser. No. 08/020,384 filed Feb. 22, 1993, now abandoned.

BACKGROUND OF THE INVENTION

This invention relates to an image copying apparatus in which image information read from originals is copied onto both the front and back sides of a recording medium such as recording paper.

In a conventional image copying apparatus of this type in which copying is possible on both sides of recording paper, the two-sided copying operation is performed by copying image information, which has been read from an original, onto one side of a sheet of paper, turning the sheet over and then copying subsequent image information onto the other side of the sheet of paper.

In a case where originals of the kind shown in FIG. 28A are to be subjected to double-sided copying using the conventional image copying apparatus described above, the double-sided copying is carried out by placing each original on the platen of the apparatus lengthwise, as shown in FIG. 28B. If the copies are to be bound along one side, copying is performed in the state shown in FIG. 28C. However, in a case where each original is placed on the platen sideways, as shown in FIG. 28D, double-sided copying is performed using recording paper provided sideways and the resulting copies are bound along one side, copying takes on the state shown in FIG. 28E, as a result of which even-numbered pages are turned upside down. This is very inconvenient.

SUMMARY OF THE INVENTION

An object of the present invention is to provide an image copying apparatus in which double-sided copying is capable of being carried out in a normal copying state irrespective of how the originals are placed on the platen.

According to the present invention, the foregoing object is attained by providing an image copying apparatus for reading image information from an original placed at a prescribed position of the apparatus and forming the image information on recording paper, comprising means for detecting a size of the original, means for detecting a size of the recording paper, means for deciding an angle of rotation of the image information in a two-dimensional plane based upon the size of the original and the size of the recording paper, first image forming means for forming first image information, after it has been rotated based upon the angle of rotation, on the recording paper, reversing means for turning over the recording paper on which an image has been formed by the first image forming means, and second image forming means for forming second image information, after it has been rotated based upon the angle of rotation, on the recording paper after it has been reversed by the reversing means.

The present invention further provides an image copying apparatus for reading image information from an original placed at a prescribed position of the apparatus and forming the image information on recording paper, comprising means for detecting a direction in which the original has been placed at the prescribed position, means for detecting a direction in which the recording paper has been set, means for deciding an angle of rotation of the image information in a two-dimensional plane based upon the direction in which the original has been placed and the direction in which the recording paper has been set, first image forming means for forming first image information, after it has been rotated based upon the angle of rotation, on the recording paper, reversing means for turning over the recording paper on which an image has been formed by the first image forming means, and second image forming means for forming second image information, after it has been rotated based upon the angle of rotation, on the recording paper after it has been reversed by the reversing means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 1:
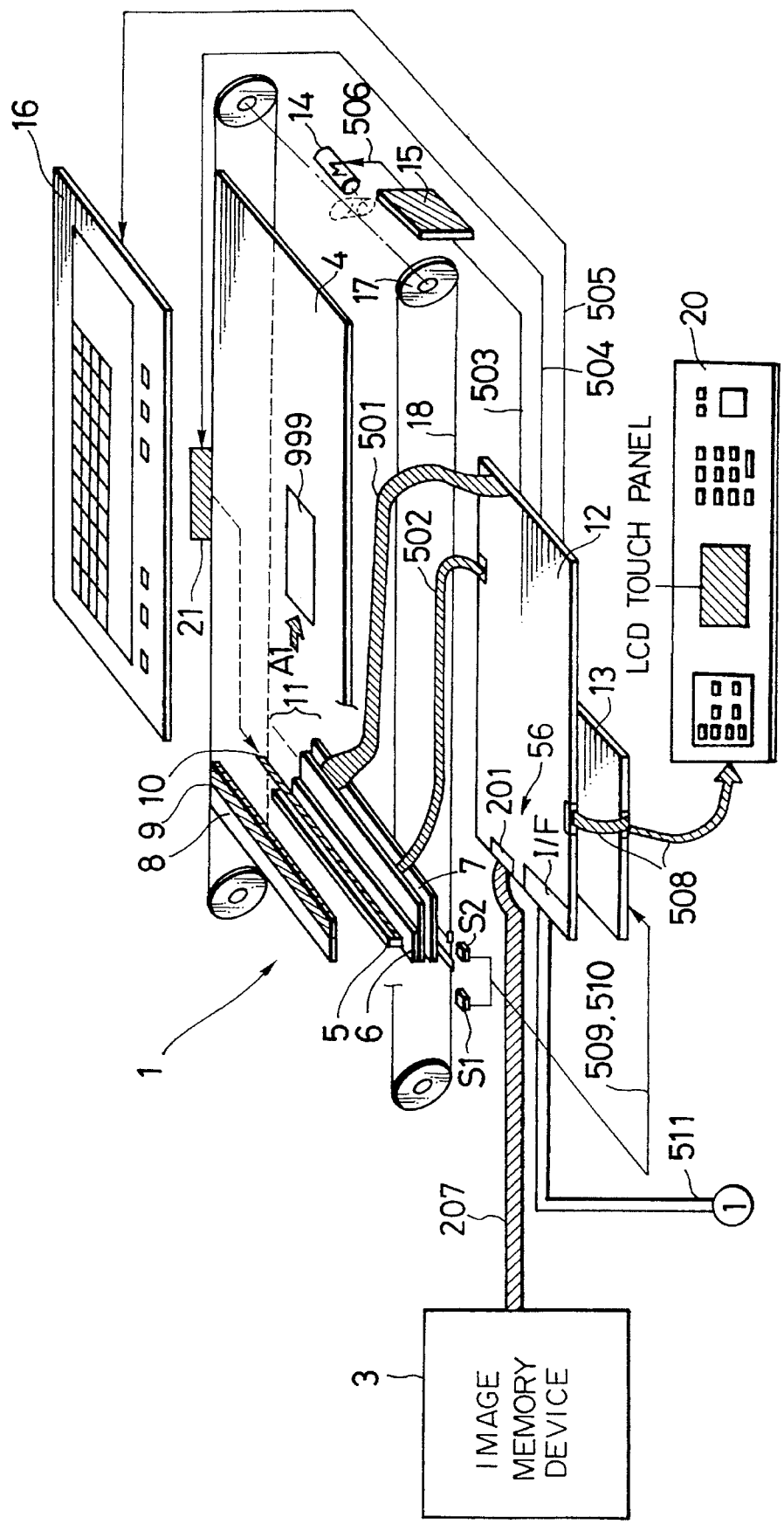
FIGS. 1 and 2 illustrate an example of the general internal configuration of an image copying apparatus according to an embodiment of the present invention.
Figure 2:
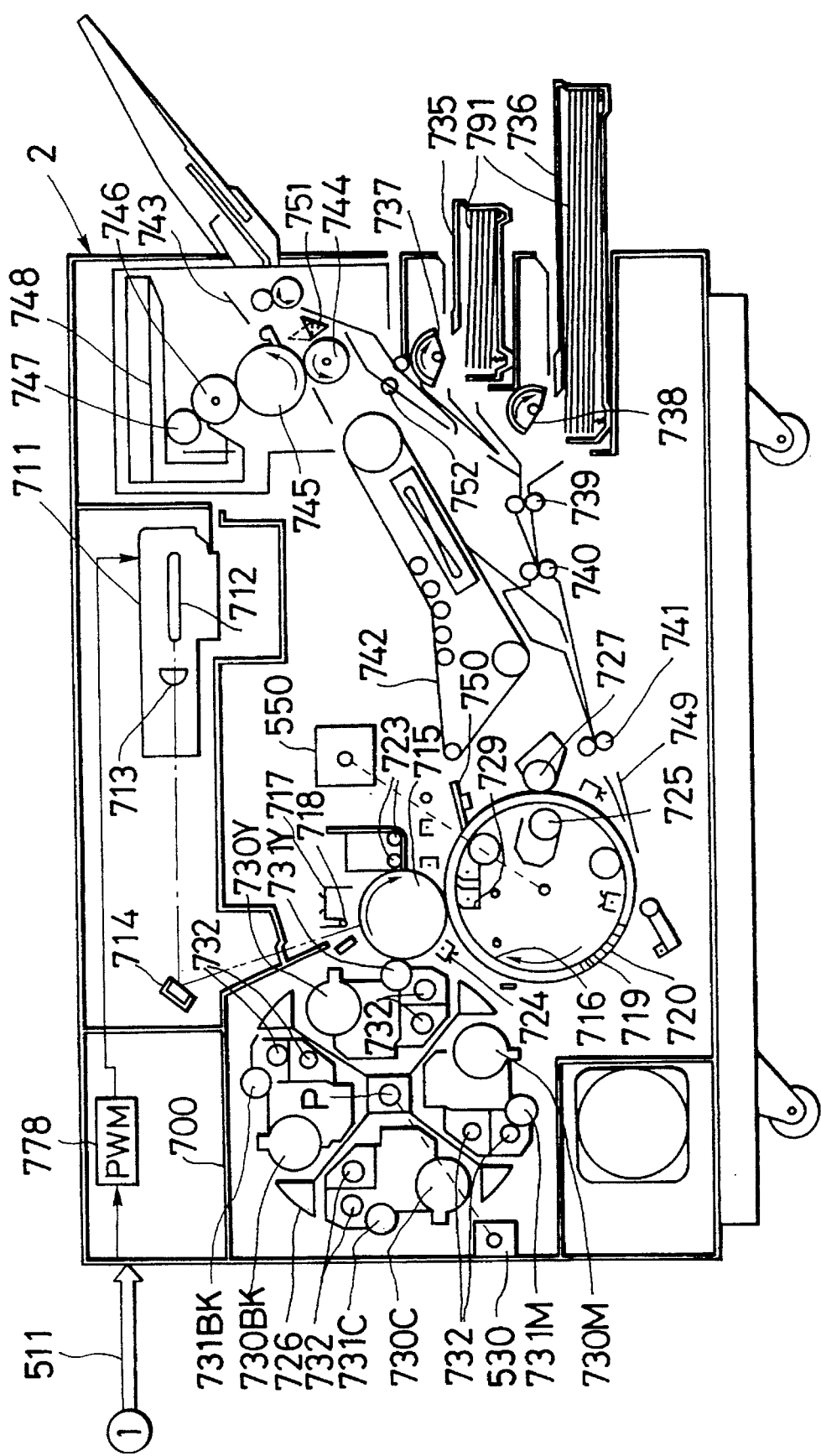

FIGS. 1 and 2 illustrate an example of the general internal configuration of an image copying apparatus according to an embodiment of the present invention. The principal components of the apparatus are a digital color-image reading device (hereinafter referred to as a "color reader") 1, which is located in the upper portion of the apparatus, for reading a digital color image, a digital color-image printing device (hereinafter referred to as a "color printer") 2 for printing out the digital color image, and an image memory device 3. The color printer 2 and image memory device 3 are located in the lower portion of the apparatus.

The color printer 1 includes color separating means and a photoelectric transducer, composed of a CCD or the like, described below, by which color image information on a color original is read color by color and converted into an electric digital image signal. The color printer 2 in an electrophotographic-type laser-beam color printer in which the color image is limited color by color in dependence upon the digital image signal to be outputted, after which transfer and recording of the image on a sheet of a recording medium, i.e., recording paper, are performed a plurality of times digitally in the form of dots.

The image memory device 3 stores the digital image information read by the color reader 1.

Each of these units will now be described in greater detail.

<Description of Color Printer 1>

The construction of the color printer 1 will be described first.

The color printer 1 shown in FIG. 1 includes a glass platen 4 on which an original 999 is placed, and a rod-array lens 5 for collecting a reflected-light image from the original 999 scanned by a halogen exposure lamp 10 and inputting the resulting image to a full-color sensor 6 whose magnification ratio is 1:1. The rod-array lens 5, the 1:1 full-color sensor 6, an amplifying circuit 7 for amplifying the sensor output signal and the halogen exposure lamp 10 together construct an original scanning unit 11 by which the original 999 is exposed and scanned in the direction of the arrow (A1 in FIG. 1).

The image information to be read from the original 999 is read successively line by line under exposure and scanning performed by the scanning unit 11. The color-separated image signal resulting from the reading operation are amplified to a predetermined voltage by the amplifying circuit 7, after which the amplified signals are inputted to a video processing unit 12 by a signal line 501. The latter is constituted by a coaxial cable in order to assure faithful signal transmission.

A signal line 502 supplies the driving pulses of the 1:1 full-color sensor 6. The necessary driving pulses are generated entirely within the video processing unit 12. Numerals 8 and 9 denote white- and black-color plates for applying white- and black-level corrections to the image signal. By irradiating these plates using the halogen exposure lamp 10, signal levels of predetermined densities can be obtained and used in the white- and black-level corrections of the video signal.

The video processing unit 12 will be described below in greater detail. Numeral 13 denotes a control unit, which includes a microcomputer, for supervising overall control of the color reader 1 constituting the apparatus of the embodiment. The control unit 13 controls a display and key inputs on a control panel 20 via a bus 508 and controls the video processing unit 12. Further, the control unit 13 detects the position of the original scanning unit 11 via signal lines 509, 510 based upon signals from position sensors S1 and S2.

A control signal for controlling a stepping motor 14 is sent to a stepping-motor drive circuit 15 via a signal line 503, in response to which the drive circuit 15 outputs a pulse signal, which is for rotatively driving the stepping motor 14, via a signal line 506. The rotational driving force from the stepping motor 14 is transmitted to a pulley 17 and further to the original-scanning unit 11 by a wire 18, thereby causing the scanning unit 11 to scan the original 999. ON/OFF control of the halogen exposure lamp 10 and control of the light thereof is carried out by an exposure-lamp driver 21 via a signal line 504. Overall control of the color reader 1, such as control of a digitizer 16 and display unit, is performed via a signal line 505.

The control panel 20 of the color reader 1 includes a liquid-crystal display panel that functions also as a touch panel for inputs, and keys for providing various commands. At the time of exposure and scanning of the original, the color image signal read by the original scanning unit 11 enters the video processing unit 12 via the amplifying circuit 7 and signal line 501.

The details of the original scanning unit 11 and video processing unit 12 will now be described in detail.

Figure 3:
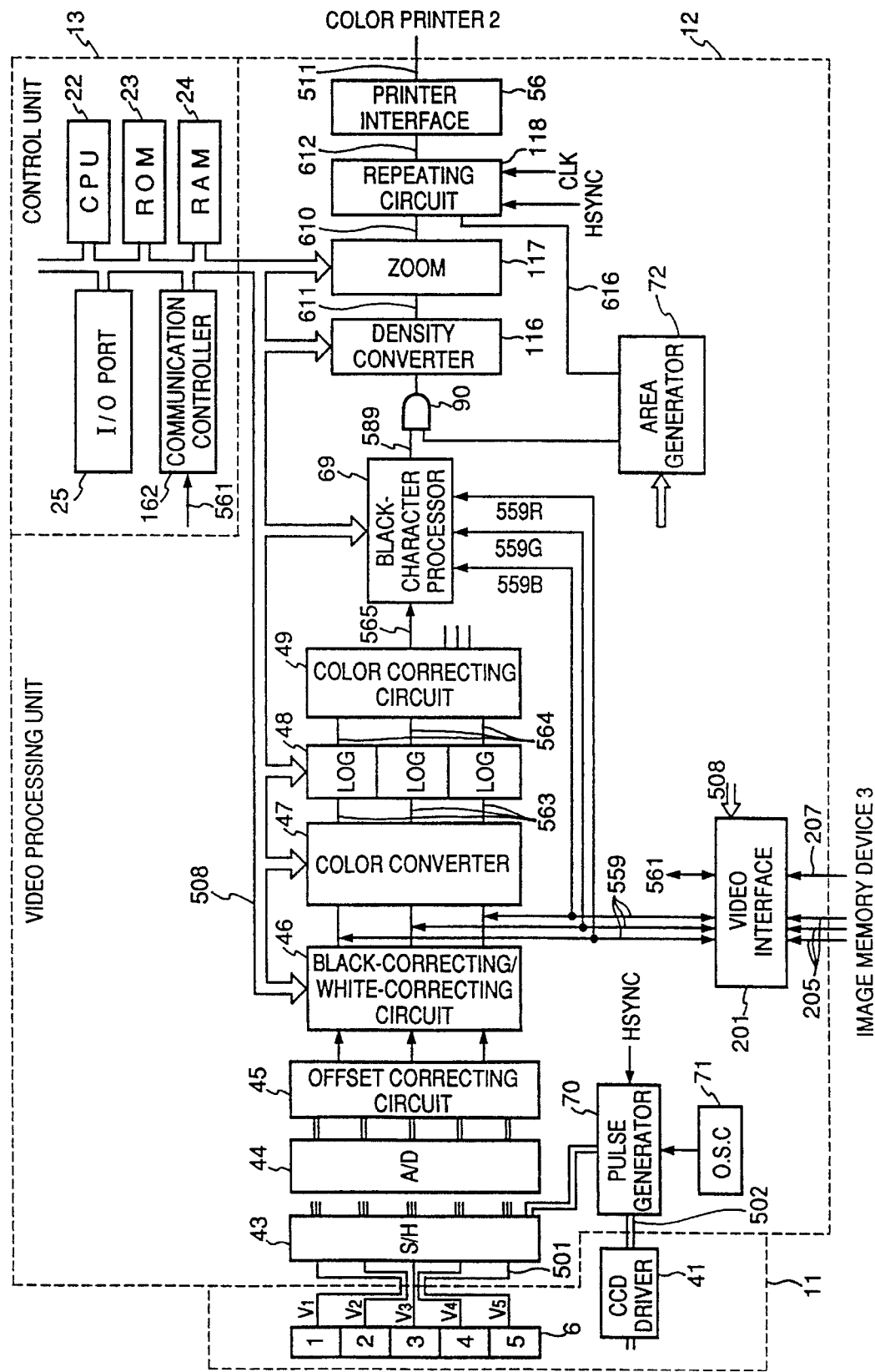
FIG. 3 is a block diagram showing the internal configuration of an original scanning unit and video processing unit in the image copying apparatus according to the embodiment.

FIG. 3 is a block diagram showing the internal configuration of the original scanning unit and video processing unit in the image copying apparatus of the present embodiment. Numeral 71 denotes a quartz oscillator (OSC) that generates basic pulses. Based upon the basic pulses from the OSC 71 and a horizontal synchronizing signal, a pulse generator 70 outputs predetermined pulses to a CCD driver 41 and a sample-and-hold (S/H) circuit 43, described below. The CCD driver 41 drives the 1:1 full-color sensor 6 and is itself driven by the pulses from the pulse generator 70. The control unit 13 has an internal CPU 22 for executing a program, which has been stored in a ROM 23, while utilizing a RAM 24 as a working area. Numeral 25 denotes an I/O port for data input/output relative to the exterior of the unit.

The color image signal that has entered the video processing unit 12 is separated into the three colors G (green), B (blue) and R (red) by the S/H circuit 43. Each color image signal thus separated is subjected to an analog/digital conversion by an A/D converter 44, whereby a digital color image signal is obtained.

In this embodiment, the full-color sensor 6 having the 1:1 magnification ratio in the original scanning unit 11 has an interdigital configuration in which it is separated into five areas. A reading positional offset of channels 2, 4 scanned previously and the remaining channels 1, 3, 5 is corrected using the 1:1 full-color sensor 6 and an offset correcting circuit 45. A signal corrected for positional offset from the offset correcting circuit 45 enters a black-correction/white-correction circuit 46 which, by utilizing signals conforming to reflected light from the white-color plate 8 and black-color plate 9, corrects for dark irregularity of the full-color sensor 6, luminous-intensity irregularity of the halogen exposure lamp 10 and sensitivity variance of the sensor. Color image data proportional the input luminous intensity of the full-color sensor 6 enters a video interface 201, which is connected to the image memory device 3.

Figure 4:
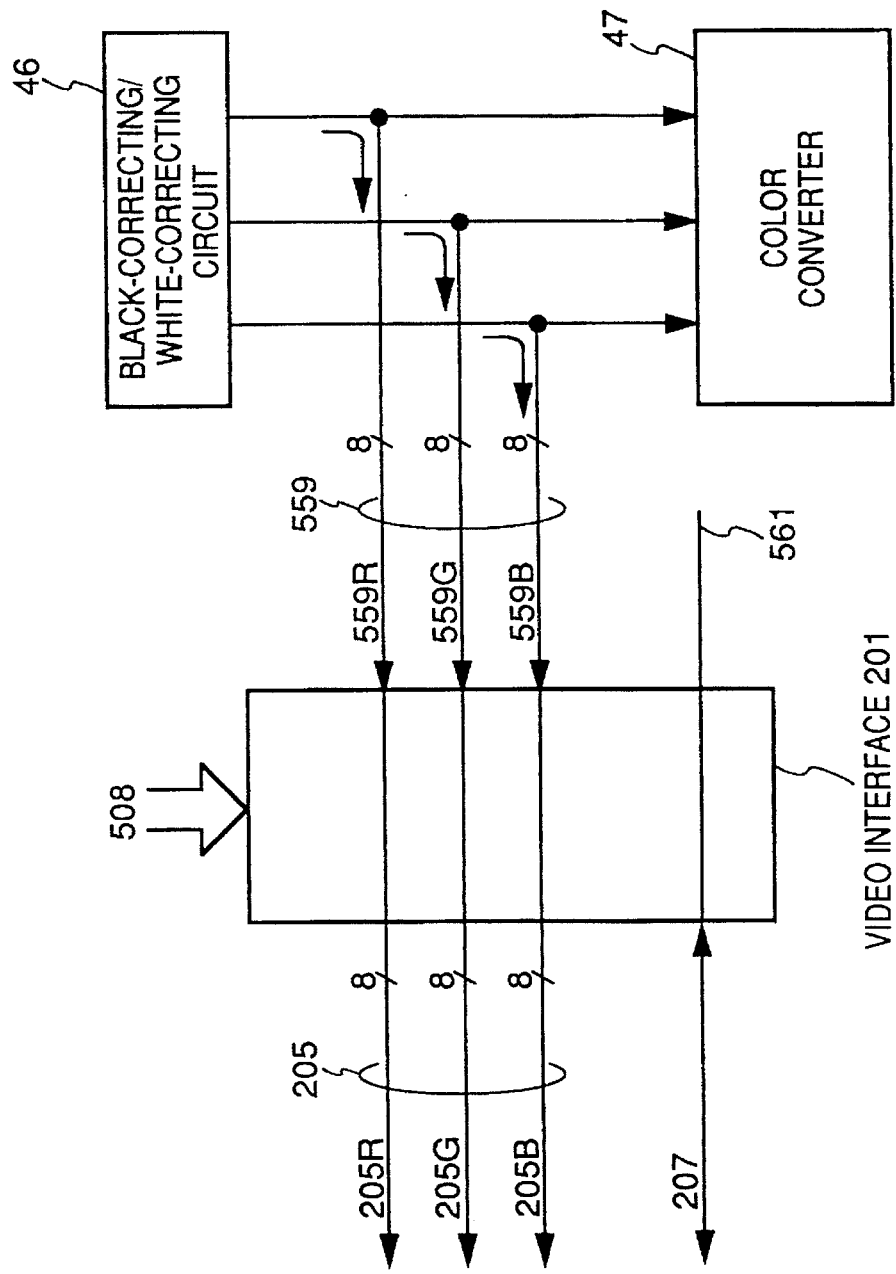
FIGS. 4 and 5 are diagrams for describing the functions of a video interface according to the embodiment.
Figure 5:
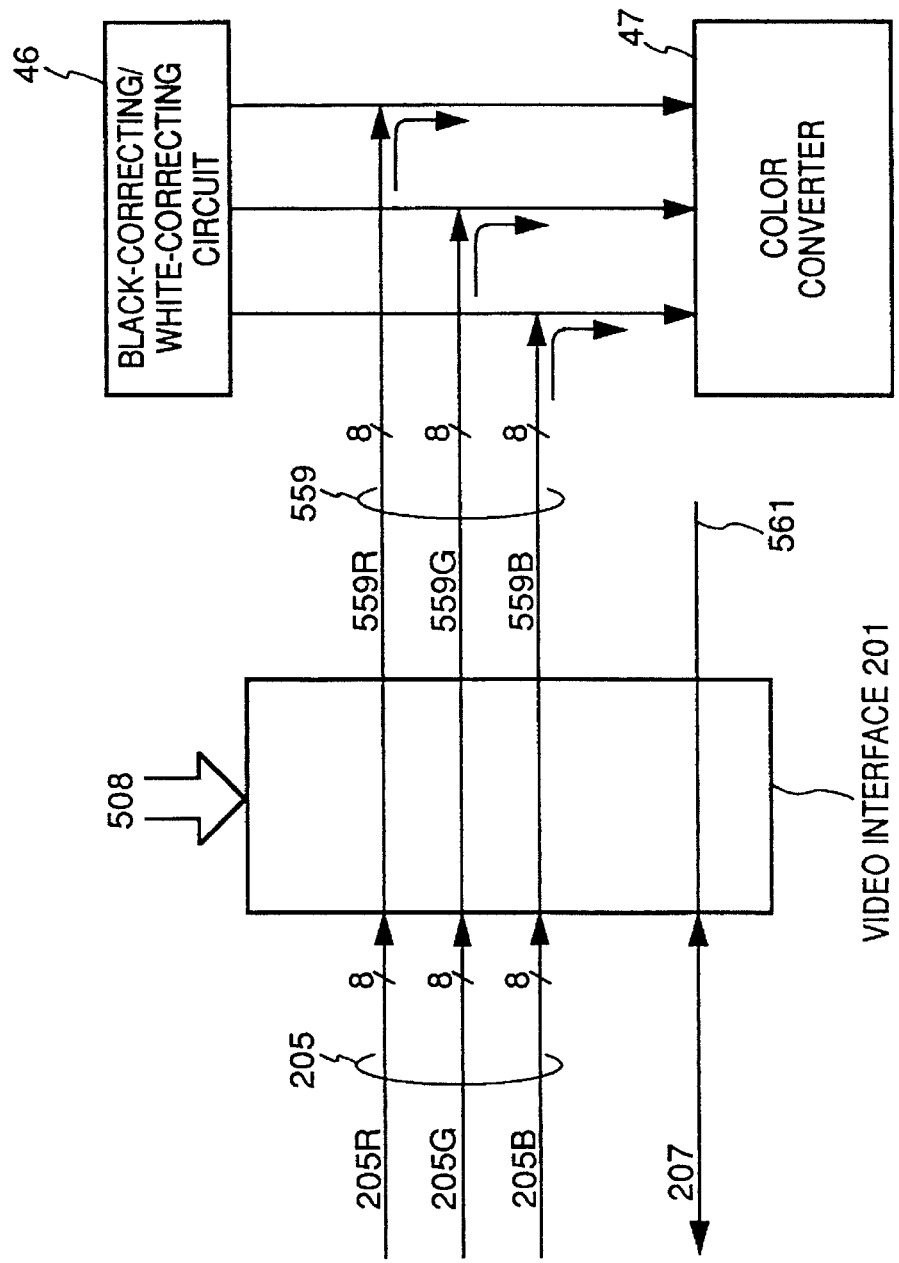

FIGS. 4 and 5 are diagrams for describing the functions of the video interface 201. The functions are as follows:

(1) One function is to output a signal 559 from the black-correction/white-correction circuit 46 to the image memory device 3 (FIG. 4).

(2) Another function is to output a signal 559 from the image memory device 3 to a color converting circuit 47 (FIG. 5).

(3) A third function is to connect a control line 207 (lines for HSYNC, VSYNC and image enable EN, etc.) between the image memory device 3 and color reader 1 and a CPU communication line 561. In particular, the CPU communication line 561 is connected to a communication controller 162 within the control unit 13 so that various commands and area information may be exchanged.

Selection of the three above-mentioned functions is changed over by a CPU control line 508 in the manner shown in FIGS. 4 and 5.

Thus, the video interface 201 has three functions and its signal lines 205, 207 are capable of bidirectional transmission. Since bidirectional transmission is possible by virtue of this arrangement, the number of signal lines can be reduced, cables can be made more slender and the cost of the apparatus can be lowered.

In FIG. 3, the image signal 559 from the black-correction/white-correction circuit 46 enters the color converting circuit 47, the action of which will be described later.

Output signals 559 from the color converting circuit 47 enter a logarithmic converting circuit (hereinafter referred to as a LOG circuit) 48 that executes processing to make these signals conform to the spectral luminous efficiency characteristics of the human eye. Here a conversion is performed to obtain white=00H, black=FFH (where H indicates a hexadecimal number). Data outputted for each of B, G and R corresponds to the density values of the output image. Since the signals of B (blue), G (green) and red (R) correspond to the amounts of yellow, magenta and cyan toner, respectively, the subsequent color image data is correlated to Y, M, C.

The color converting circuit 47 detects a specific color from the input color image data R, G, B and replaces it with another color. For example, a portion of the color red in an original is converted into the color blue or some other color.

The image data from the LOG circuit 48 enters a color correcting circuit 49, which applies a color correction, described below, to the image data of each color component from the original image, namely the yellow, magenta and cyan components.

FIGS. 6 and FIGS. 7 are diagrams for describing the color correcting method in the apparatus of this embodiment.

Figure 6A:
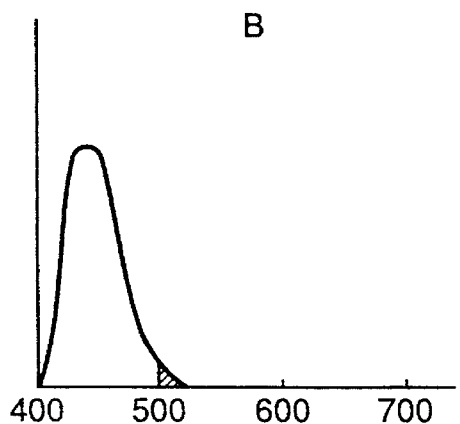
FIGS. 6 and 7 are diagrams for describing a color correcting method in the apparatus of the embodiment.
Figure 6B:
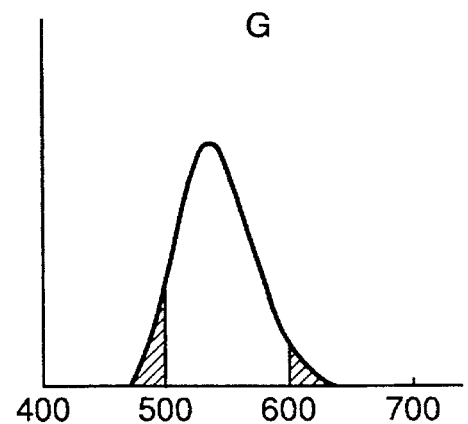
Figure 7A:
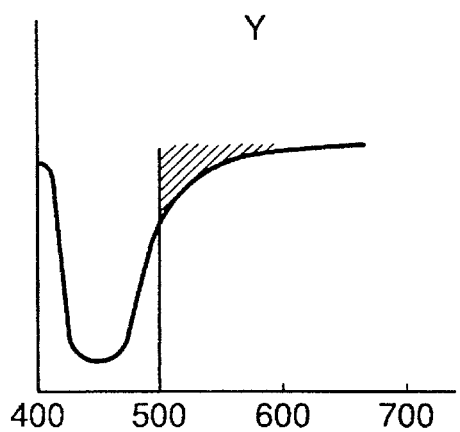
Figure 7B:
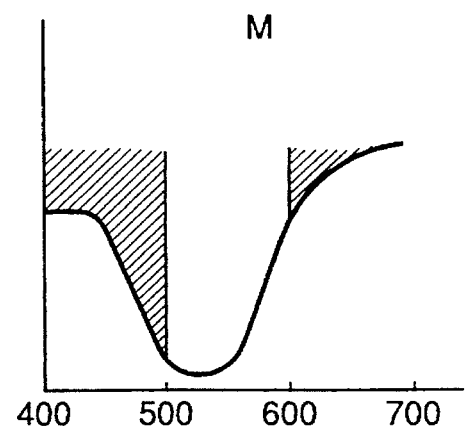

The spectral characteristics of a color separating filter disposed for every pixel in a color reading sensor have unnecessary transmission regions as indicated by the shaded portions in FIGS. 6A and 6B. On the other hand, it is well known that, say, the color toners (Y, M, C) transferred to a transfer paper also have unnecessary absorption components as shown in FIGS. 7A and 7B. Further, in FIGS. 6 and FIGS. 7, only B, Y and Y, M are illustrated.

A masking correction is well known in which a linear equation for each color is solved for color-component image data Yi, Mi, Ci as follows:

$$\begin{bmatrix} Y_0 \\ M_0 \\ C_0 \end{bmatrix} = \begin{bmatrix} aY1 & -bM1 & -Cc1 \\ -aY2 & bM2 & -Cc2 \\ -aY3 & -bM3 & -Cc3 \end{bmatrix} \begin{bmatrix} Y_i \\ M_i \\ C_i \end{bmatrix} \quad (1)$$

and color correction is carried out. Furthermore, an operation (an inking operation) often is performed, in which Min (Yi, Mi, Ci) (namely a minimum value among Yi, Mi, Ci) is calculated based upon Yi, Mi, Ci and black toner is subsequently added with the calculated value serving as black. Another operation often carried out is undercolor removal (UCR), in which the amount of each colorant added is reduced in dependence upon the black component added.

Described next will be a black-character processing circuit 69 for improving black reproduction of black characters and fine lines on an original as well as color blurring at the edge portions of fine black lines.

Figure 8:
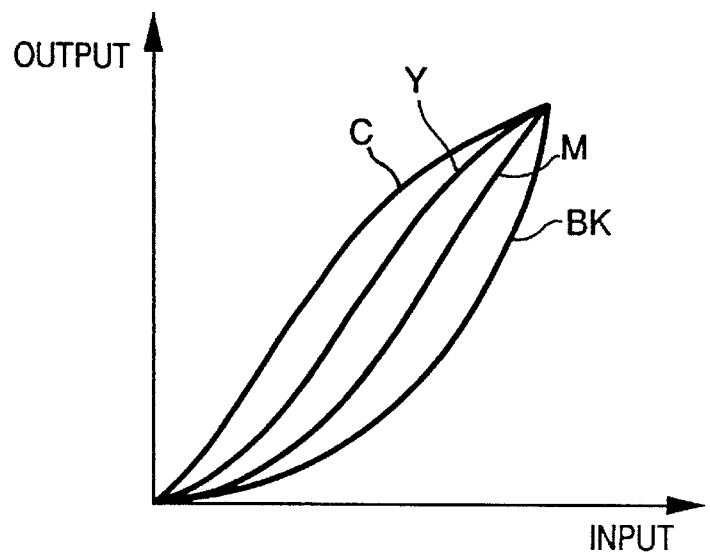
FIG. 8 is a diagram showing input/output characteristics of Y, M, C, Bk in the image copying apparatus of the embodiment.

FIG. 8 is a diagram showing input/output characteristics of Y, M, C, Bk in the color copying apparatus according to this embodiment.

Color signals 559R, 559G, 559B of R, G, B (red, green, blue) black- and white-level corrected by the black-correction/white-correction circuit 46 shown in FIG. 3 are subjected to masking and undercolor removal by the LOG circuit 48 and color correcting circuit 49, after which a color signal to be outputted to the printer is selected and the selected color signal is delivered to signal line 565. Concurrently, a luminance signal Y and color-difference signals I, Q are calculated from the signals R, G, B in order to detect achromatic color portions of the original as well as edge portions, namely portions that are black characters and fine black lines, of the original.

Based upon the Y, I, Q signals, the amount of black toner is increased at black edge portions and the amounts of Y, M, C toners is decreased at these portions, thereby expressing black portions with greater blackness. A signal 589 from the black-character processing circuit 69 enters an AND gate 90. The latter acts as a switch that determines whether the input signal 589 is transmitted to a density converting circuit 116 or not. The AND gate 90 is controlled by an area generating circuit 72.

The density converting circuit 116 (FIG. 3) is so adapted that density and tone are changed for each color, as indicated in the characteristic diagram of FIG. 8. The circuit 116 may be a LUT (look-up table), by way of example. An output signal 610 from the density converting circuit 116 enters a zoom circuit 117, which possesses a memory of one line. The zoom circuit 117 performs a zoom operation by changing the writing and reading frequencies of the memory. As a result, magnification is changed in the main-scanning direction. Varying of magnification in the sub-scanning direction is carried out by changing the scanning speed of the original scanning unit 11 in dependence upon the zoom ratio.

A signal 611 from the zoom circuit 117 enters a repeating circuit 118, which is the next stage. This circuit has a FIFO construction, as shown in FIG. 9.

Figure 9:
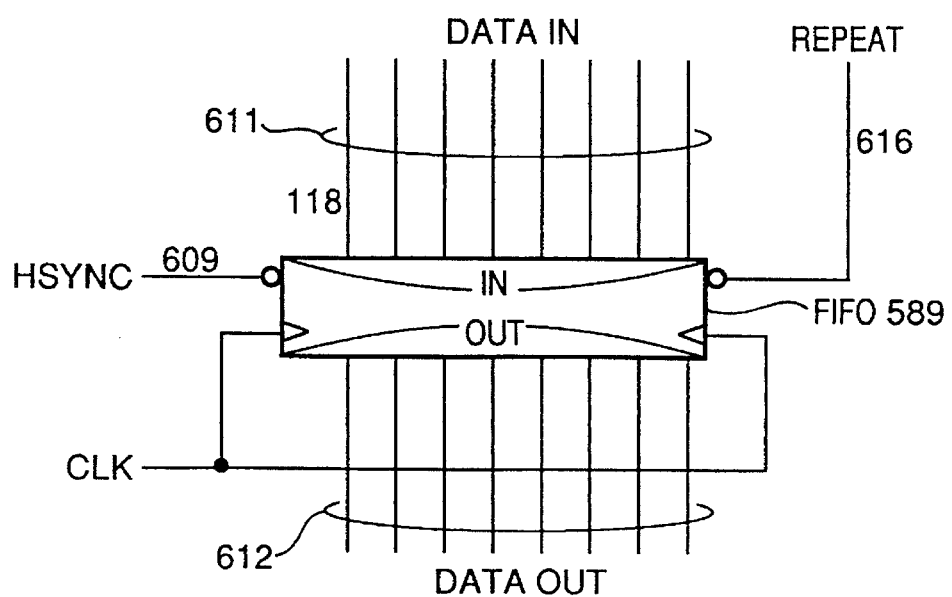
FIG. 9 is a block diagram showing the detailed construction of a repeating circuit according to the embodiment.
Figure 10:
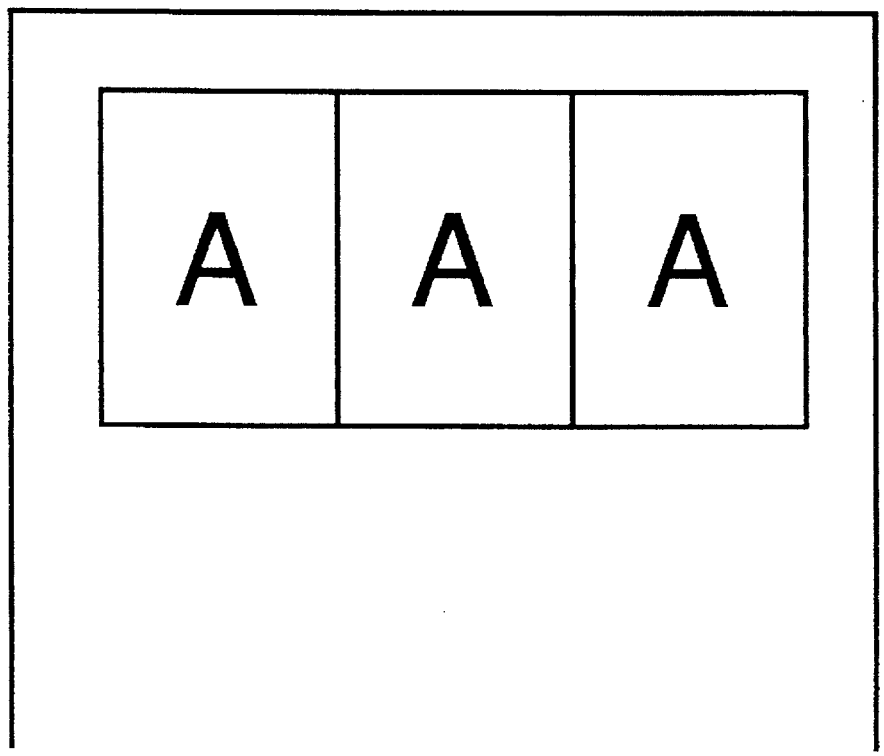
FIG. 10 is a diagram showing an example of the output of the repeating circuit according to the embodiment.

FIG. 9 is a block diagram showing the detailed construction of the repeating circuit 118, and FIG. 10 is a diagram showing an example of the output of the repeating circuit 118.

In FIG. 9, numeral 609 denotes an HSYNC signal. A single $L_0$ pulse enters as a line synchronizing signal line by line to initialize a WR (write) pointer (not shown) within the FIFO. Numeral 611 denotes input image data, and 612 denotes output image data. A repeat signal 616 initializes the RD (read) pointer of the FIFO. More specifically, by applying the identically formed repeat signal 616 to the FIFO line by line, repetition of the same image, as shown in FIG. 10, is carried out.

The image information processed by the video processing unit 12 is outputted to the color printer 2 via the printer interface 56.

<Description of Color Printer 2>

The construction of the color printer 2 will be described next.

In the color printer 2 shown in FIG. 2, numeral 711 denotes a scanner, namely a laser output unit that converts the image signal from the color reader 1 (FIG. 1) into a light signal. The laser output unit 711 includes a polygon mirror 712 of a polyhedron (e.g., an octahedron), a motor (not shown) for rotating the polygon mirror 712, and an f/θ lens (imaging lens) 713. Numeral 714 denotes a reflecting mirror that changes the optical path of the laser beam (indicated by the one-dot chain line) from the scanner 711, and number 715 denotes a photosensitive drum.

The laser beam emitted by the laser output unit 711 is reflected by the polygon mirror 712 and is made to linearly scan (raster scan) the surface of the photosensitive drum 715 by the f/θ lens 713 and reflecting mirror 714, thereby forming a latent image corresponding to the image of the original.

Numeral 717 denotes a primary charging device, 718 a full-page exposure lamp, 723 a cleaner for recovering residual toner that has not been transferred, and 724 a pre-transfer charging device. These components are arranged to surround the photosensitive drum 715. Numeral 726 denotes a developer unit for developing the electrostatic latent image formed on the surface of the photosensitive drum 715 by exposure to the laser. Further, 731Y (for yellow), 731M (for magenta), 731C (for cyan) and 731BK (for black) represent developing sleeves for performing direct development by coming into contact with the photosensitive drum 715, and 730Y, 730M, 730C, 730 Bk represent toner hoppers provided with extra toners in advance. Numeral 732 denotes a screw for conveying a developing agent. The sleeves 731Y~731Bk, toner hoppers 730Y~730Bk and screws 732 construct the developer unit 726 and are arranged to surround a rotary shaft P of the developer unit 26.

When a yellow toner image is formed, for example, the developer unit 726 performs yellow toner development at the position shown in FIG. 2. When the magenta toner image is formed, the developer unit 726 is rotated about the shaft P by the motor 530 to place it at a position at which the developing sleeve 731M within the magenta developer unit will come into contact with the photosensitive drum 715. With regard to development of cyan and black, the developer unit 726 is rotated about the shaft P is similar fashion.

Numeral 716 denotes a transfer drum that transfers the toner image, which has been formed on the photosensitive drum 715, to paper 791. Numeral 719 denotes an actuator plate for detecting the position to which the transfer drum 716 has been moved, 720 a position sensor which, owing to approach by the actuator plate 719, senses that the transfer drum 716 has moved to a home position, 725 a transfer drum cleaner, 727 a paper restraining roller, 728 a charge removing device, and 729 a transfer charging device. These components are arranged to surround the transfer roller 716.

Numerals 735, 736 denote paper-feed cassettes for managing the paper (individual sheets) 791. Numerals 737, 738 denote paper feed rollers for feeding the paper from the cassettes 735, 736, and 739, 740, 741 designate timing rollers that determine the timing of paper feed and conveyance. Paper feed and conveyed via these components is introduced to a paper guide 749 and is wound about the transfer drum 716 while its leading edge is gripped by a gripper, described later. Operation then proceeds to an image forming process.

Numeral 550 represents a drum rotating motor for synchronously rotating the photosensitive drum 715 and transfer drum 716. Shown at 750 is a strip-off device that strips the paper off the transfer drum 716 following the image forming process. Numeral 742 denotes a conveyor belt for conveying the paper that has been stripped off the drum 716, and 743 represents an image fixing unit that fixes the paper conveyed thereto by the conveyor belt 742. In the image fixing unit 743, the rotating force of a motor 747 mounted on a motor mounting portion 748 is transmitted to a pair of heating pressure rollers 744, 745 via a transmission gear 746. As a result, the image on the conveyed paper is fixed between the heating pressure rollers 744, 745.

In the event of a single-sided copy, the fixed paper is ejected as is to the exterior of the apparatus by a paper ejecting roller 754. In case of a double-sided copy, the paper passes by a paper ejection sensor 753, after which a paper ejection flapper 751 attains the state indicated by the dashed line in FIG. 2. The rotation of the paper ejecting roller 754 is reversed in direction to convey the paper to a double-side path 752 and thence to the timing rollers 739, 740, 741, as a result of which the paper is again held upon the transfer drum so that an image may be formed thereon.

Print-out processing in the color printer 2 having the construction set forth above will now be described.

Figure 11:
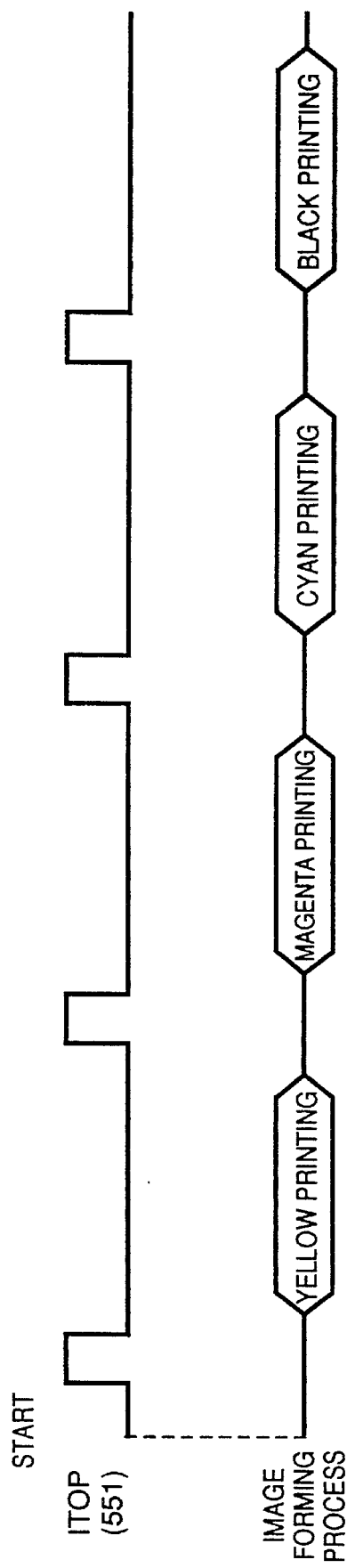
FIG. 11 is a timing chart of timing that prevails when printing is performed in the image copying apparatus according to the embodiment.

FIG. 11 is a timing chart of timing that prevails when printing is performed in the image copying apparatus according to the embodiment. ITOP (551) is a synchronizing signal in the image feed direction (sub-scanning direction) and is generated once every time one screen is fed, namely one time for each feed of an image in each of the four colors (yellow, magenta, cyan, black), for a total of four times. When the leading edge of the transfer paper wound around the transfer drum 716 of the color printer 2 undergoes transfer of the toner image at the point of contact with the photosensitive drum 15, the rotation of the transfer drum 716 and the rotation of the photosensitive drum 715 are synchronized so that the leading edge of the original and the position of the edge will coincide. These signals are sent to the video processing unit 12 via a cable (not shown).

More specifically, at the instant of the initial ITOP pulse, the Y latent image is formed on the photosensitive drum 15 by the laser beam and this image is developed by the developer unit 731Y. Next, the image is transferred to the paper on the transfer drum 715 and processing for printing in the color yellow is carried out. The developer unit 726 turns about the shaft P of FIG. 2.

At the instant of the next ITOP pulse, the M latent image is formed on the photosensitive drum 15 by the laser beam and processing for printing in the color magenta is performed through an operation similar to that described above. By performing this operation in similar fashion for C and Bk in correspondence with the ensuing ITOP pulses, processing in the colors cyan and black is executed.

When the process for image formation ends, the paper is stripped off by the strip-off device 750 and is fixed by the image fixing unit 743, thereby ending the printing of a series of color images.

<Description of Image Memory Device>

A method of storing image information in the image memory device 3 from the color reader 1 constituting the image copying apparatus of this embodiment, as well as an operation for reading image information out of the image memory device 3, processing the information and performing image formation by the color printer 2, will be described in detail.

The operation through which an image from the color reader 1 is stored will be described first.

Figure 12:
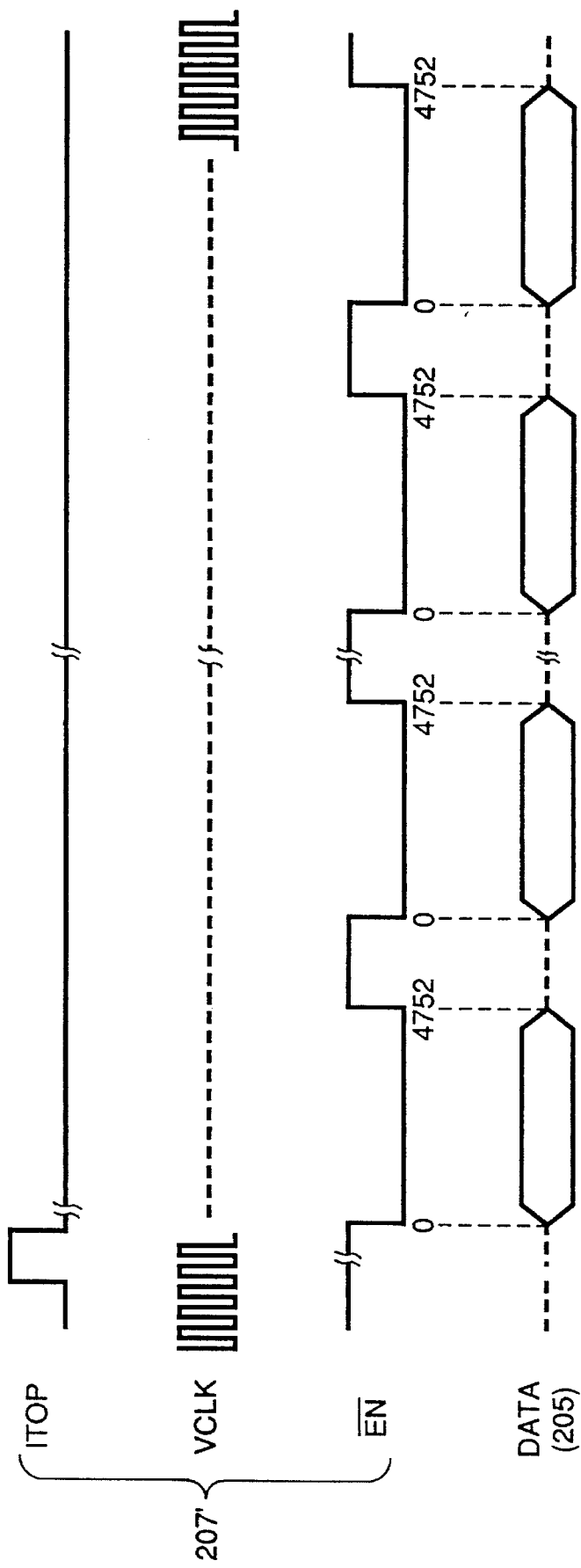
FIG. 12 is a timing chart that prevails when image storage is carried out in the embodiment.
Figure 13:
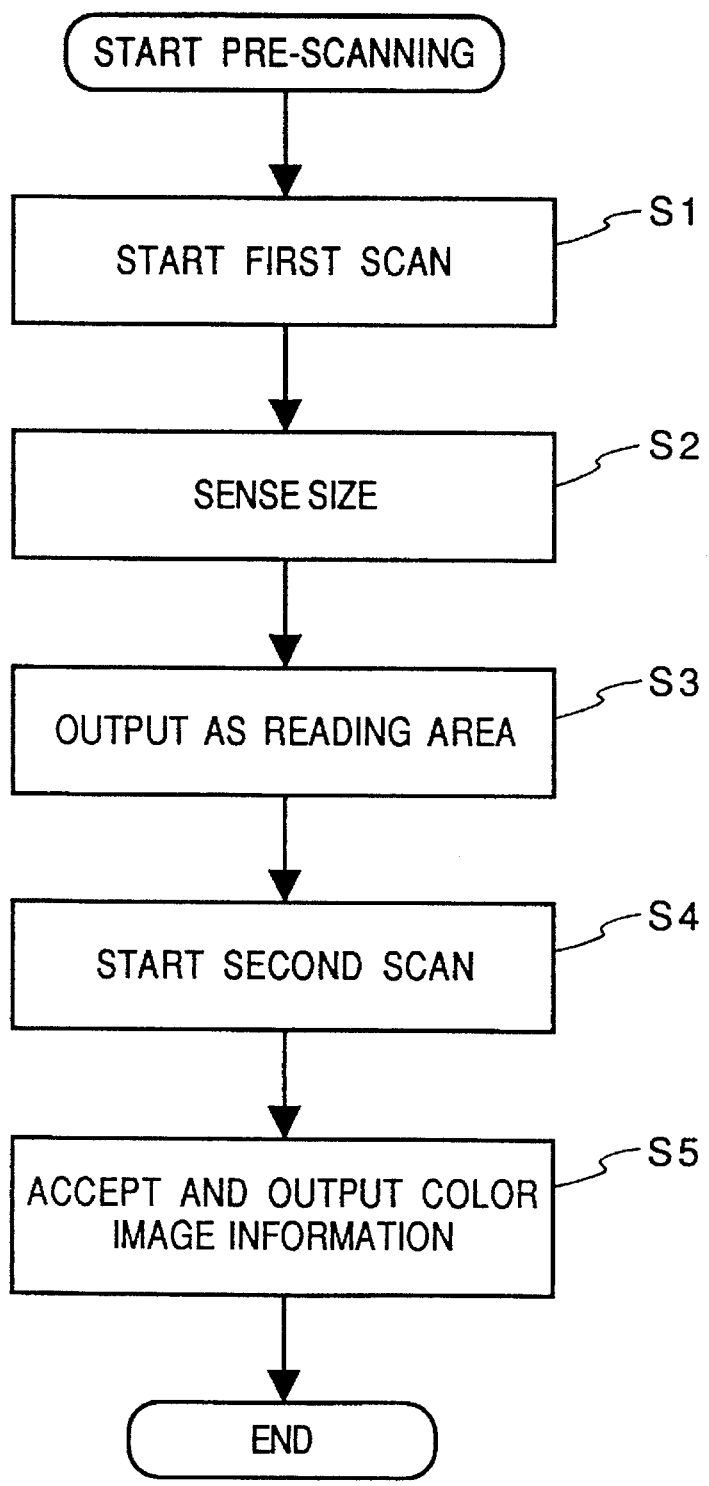
FIG. 13 is a flowchart for describing a reading operation performed by a CPU in the image copying apparatus according to the embodiment.

FIG. 12 is a timing chart that prevails when image storage is carried out in the embodiment, and FIG. 13 is a flowchart for describing a reading operation performed by the CPU 22 in the image copying apparatus according to the embodiment.

The setting of reading area by the color reader 1 is carried out by pre-scanning the original 999 using the original scanning unit 11 shown in FIG. 1. In other words, as shown in FIG. 13, the original 999 is scanned by the original scanning unit 11 (step S1) and the size of the original is sensed by the CPU 22 within the control unit 13 (step S2).

The size of the original, i.e., the information in the reading area, is sent to the video interface 201 via the communication line 501 in FIG. 1. This information fed into the video interface 201 is sent to the image memory device 3 via the signal line 207 (step S3).

The color reader 1 outputs a VCLK signal, ITOP, an EN signal, etc., shown in the timing chart of FIG. 12, to the image memory device 3 together with image data 205. The flow of data in the video interface 201 is illustrated in FIG. 4.

By pressing a start button on the control panel 20, the stepping motor 14 is driven into operation so that the original scanning unit 11 starts scanning (step S4). When scanning reaches the leading end of the original, the ITOP signal goes to logical "1", as shown in FIG. 12. The original scanning unit 11 reaches the area designated by pre-scanning and the EN signal goes to logical "0" during the scanning of this area. As a consequence, the color image information (DATA 205) read during the time that the EN signal is at logical "0" is accepted.

As for the transfer of image data from the color reader 1, the control signals ITOP and EN and VCLK are outputted from the video interface 201 as signals 207', as illustrated in FIG. 12, by controlling the video interface 201 in the manner shown in FIG. 4, and R data 205R, G data 205G and B data 205B are sent to the image memory device 3 in real time in synchronism with the signals 207' (step S5).

A specific storage operation of the image memory device 3 based upon this image data and these control signals will now be described in detail.

Figure 14:
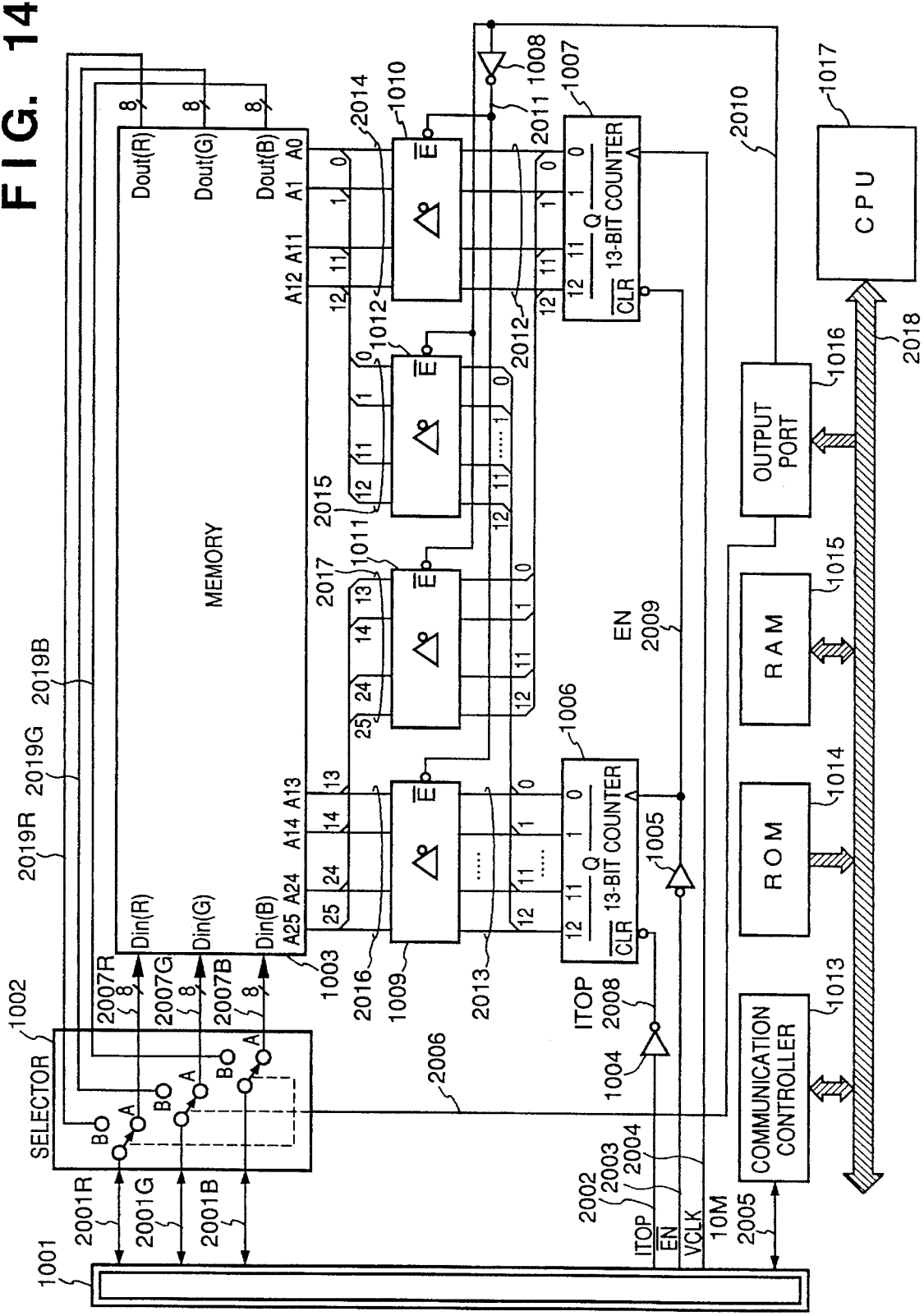
FIG. 14 is a detailed circuit diagram showing the configuration of an image memory device in the image copying apparatus according to the embodiment.

FIG. 14 is a detailed circuit diagram showing the configuration of the image memory device 3 in the image copying apparatus according to the embodiment. Shown in FIG. 14 are a connector 1001, a selector 1002, a memory 1003, inverters 1004, 1005, 1008, 13-bit counters 1006, 1007, tri-state buffers 1009, 1010, 1011, 1012 and a communication controller 1013. Also shown are a CPU 1017 that performs overall control of the image memory device 3, a ROM 1014 that stores various programs for operation of the CPU 1017, a RAM 1015 serving as a working area used when the CPU 1017 executes the various programs in the ROM 1014, and an output port 1016.

Further, numerals 2001R, 2001G, 2001B, 2007R, 2007G, 2007B, 2019R, 2019G, 2019B and 2012–2017 denote signal lines. Also shown are an ITOP signal 2002, an EN signal 2003, a video clock (VCLK) 2004, a communication signal (COM) 2005, a select signal 2006, an ITOP signal 2008, an EN signal 2009, a control signal 2010, and a bus line for transmitting address signals, data and control signals.

The operation of this circuit will now be described.

The connector 1001 is connected to the video interface 201 in the color reader 1 of FIG. 3 via a cable. The items of R data 205R, G data 205G and B data 205B enter signal lines 2001R, 2001G and 2001B, respectively, via the connector 1001. The control signals and the signal 207, which is the communication signal, similarly enter signal lines 2002–2005 via the connector 1001.

The image signals (hereinafter referred to as "2001R'", "2001G'", "2001B'") that pass through the signal lines 2001R, 2001G, 2001B enter the selector 1002. At the time of image storage, the selector 1002 is set to side A in FIG. 14 by the select signal 2006, and the image signals 2001R', 2001G', 2001B' (hereinafter referred to collectively as "image information 2001") that have entered are fed into the memory 1003 through the signal lines 2007R, 2007G, 2007B, respectively.

The ITOP signal 2002 is inverted by the inverter 1004 and enters the clear terminal of the counter 1006 as the ITOP signal 2008. The EN signal 2003 is inverted by the inverter 1005 and then enters the clock input terminal of the counter 1006 and the clear terminal of the counter 1007 as the EN signal 2009. Furthermore, VCLK 2004 enters the clock input terminal of the counter 1007.

A method of storing data in the memory 1003 will be described in detail using an original of size A4 as an example.

Figure 15:
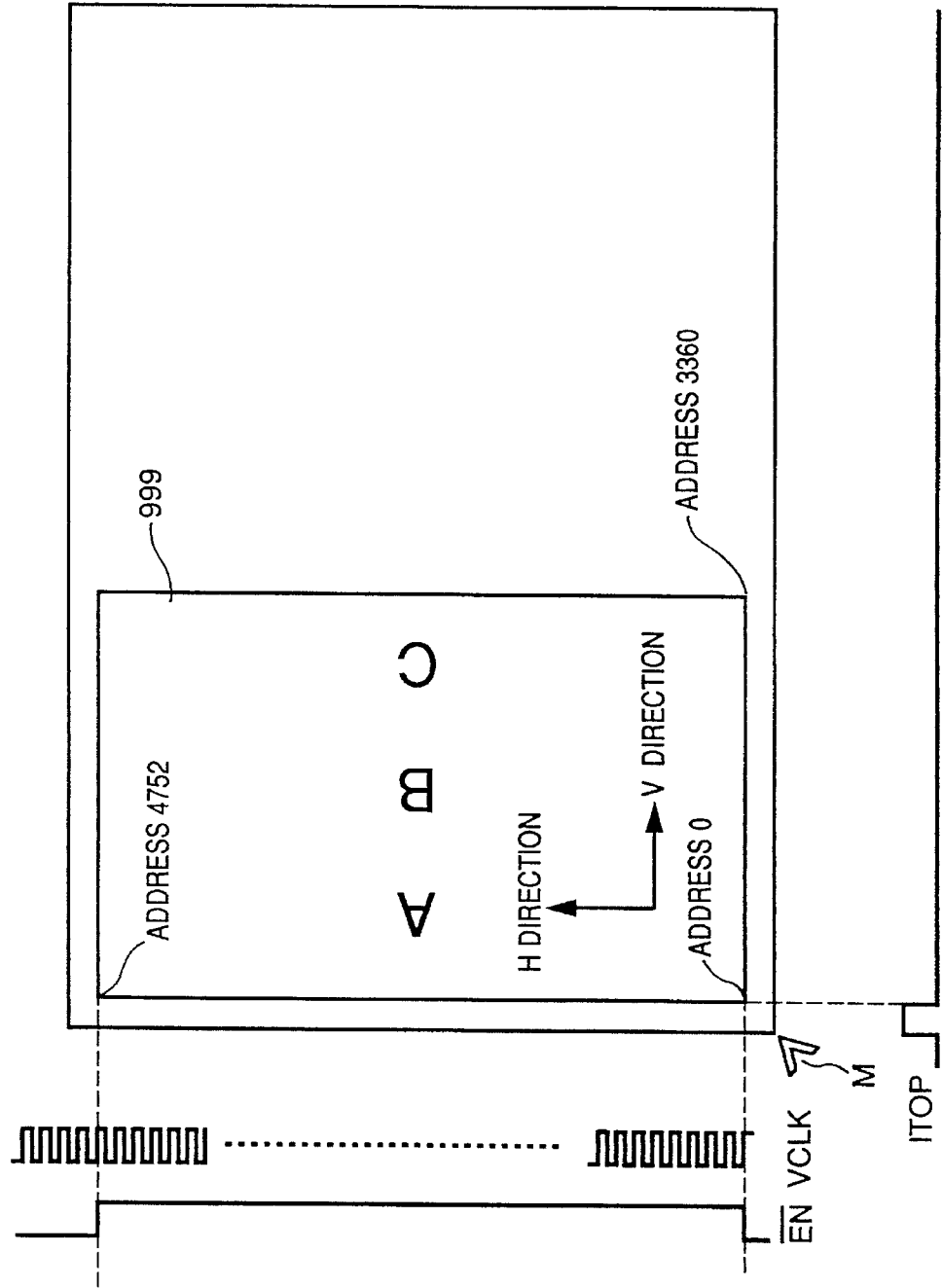
FIG. 15 is a diagram showing an example in which an A4-size original is placed upon a glass platen constituting the image copying apparatus of the embodiment.

FIG. 15 is a diagram showing an example in which the A4-size original 999 is placed upon the glass platen 4 of the color reader 1 constituting the image copying apparatus of the embodiment. FIG. 15 also shows the control signals from the video processing unit 12.

The original scanning unit 11 of this embodiment reads in the original 999 at 16 dots/mm, converts this into digital information and feeds the digital information into the image memory device 3.

In a case where the original 999 has been set in accordance with a reference mark indicated at M in FIG. 15, the horizontal (H) direction of the original corresponds to addresses 0 through 4752 and its vertical (V) direction corresponds to addresses 0 through 3360. This defines the orientation of the original. The aforesaid control signals 207' (EN, VCLK, ITOP) are generated at the timing shown in FIG. 15 and sent to the image memory device 3.

Figure 16:
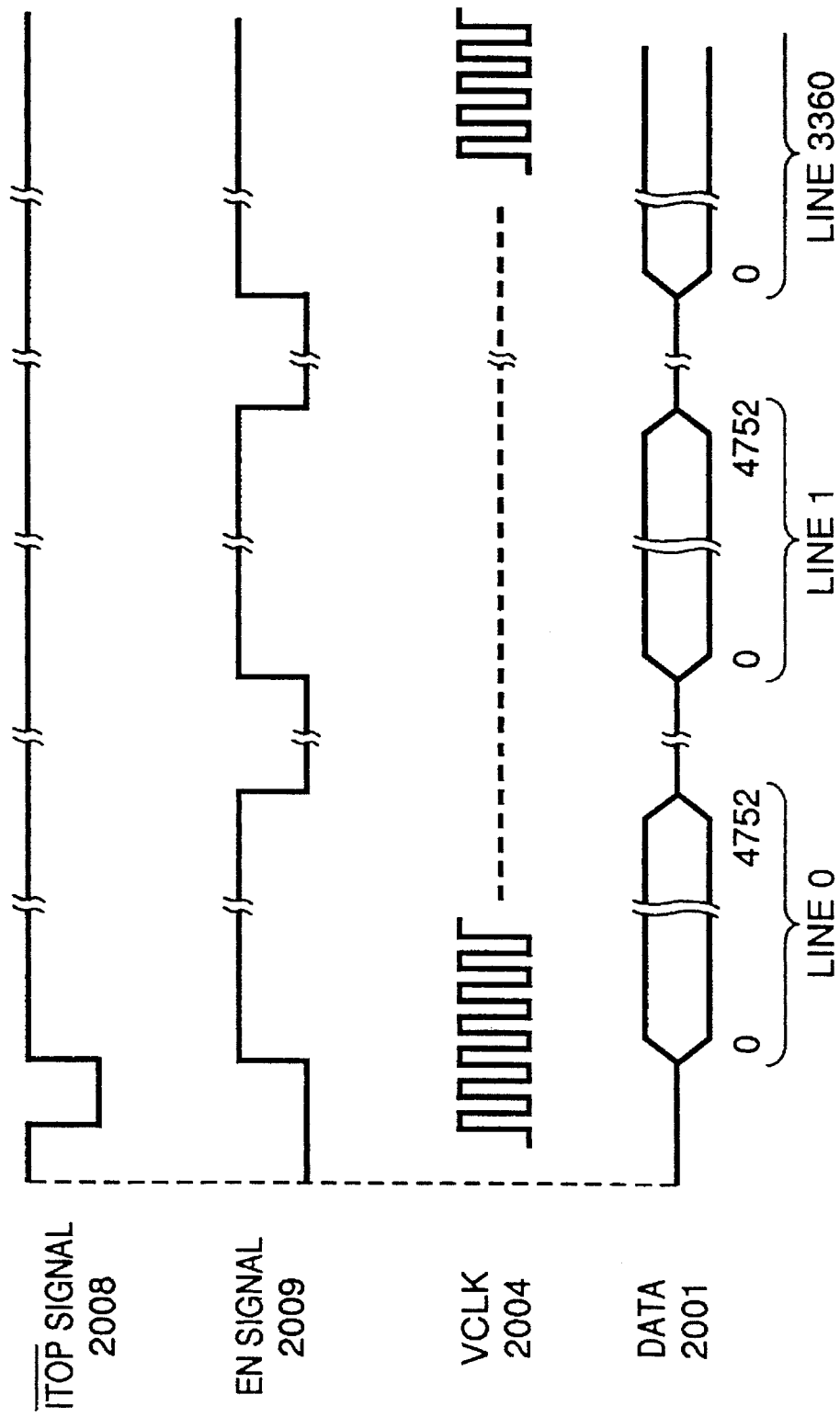
FIG. 16 is a timing chart of signals corresponding to control signals and image signals from the video processing unit of this embodiment.

FIG. 16 is a timing chart of signals within the image memory device 3 that correspond to the control signals 207' and image signal 205 from the video processing unit 12 in this embodiment.

When the ITOP signal 2008 is logical "0" the counter 1006 is cleared and the counter output 2013 becomes all "0"s. At this time the EN signal 2009 is "0", the counter 1007 is cleared and the counter output delivered on the signal line 2012 becomes all "0"s. Further, when the ITOP signal changes from "0" to "1", the effective image information 2001 of the original is outputted and the EN signal 2009 changes from "0" to "1". The connector 1001 delivers VCLK 2004 at all times.

When the EN signal 2009 becomes logical "1" the counter 1007 starts being counted up in synchronism with VCLK 2004 and the value recorded in the counter 1007 is delivered on signal line 2012. When time equivalent to 4752 pulses of VCLK 2004 elapses following a change in the signal level of the EN signal 2009 from "0" to "1", the EN signal again reverts to logical "0". The output of the counter 1007 takes on values of from 0 to 4752 owing to the control of the EN signal 2009 described above.

After the counter 1006 is cleared by the ITOP signal 2008 in the manner described above, it is counted up whenever the EN signal 2009 changes from "0" to "1". That is, the counter 1007 outputs the address in the H direction and the counter 106 outputs the address (line) in the V direction. The output of the counter 1007 enters the tri-state buffers 1010, 1011 via the signal line 2012. The output of the counter 1006 enters the tri-state buffers 1009, 1012 via the signal line 2013.

In a case where the image information is made to enter the memory 1003 via the signal lines 2007R, G, B, control is performed by the control signal 2010 from the output port 1016 in such a manner that the tri-state buffers 1009, 1010 become effective. In other words, the output of the counter 1007 enters A0–A12 of the memory 1003 via the signal line 2012 and tri-state buffer 1010 and through the signal line 2014. The output of the counter 1006 enters A13–A25 of the memory 1003 via the signal line 2013 and tri-state buffer 1009 and through the signal line 2016. More specifically, the memory 1003 has a 26-bit address, namely A0 through A25, and the addresses A0–A12, A13–A25 are controlled by the outputs from the individual counters 1006, 1007.

Figure 17:
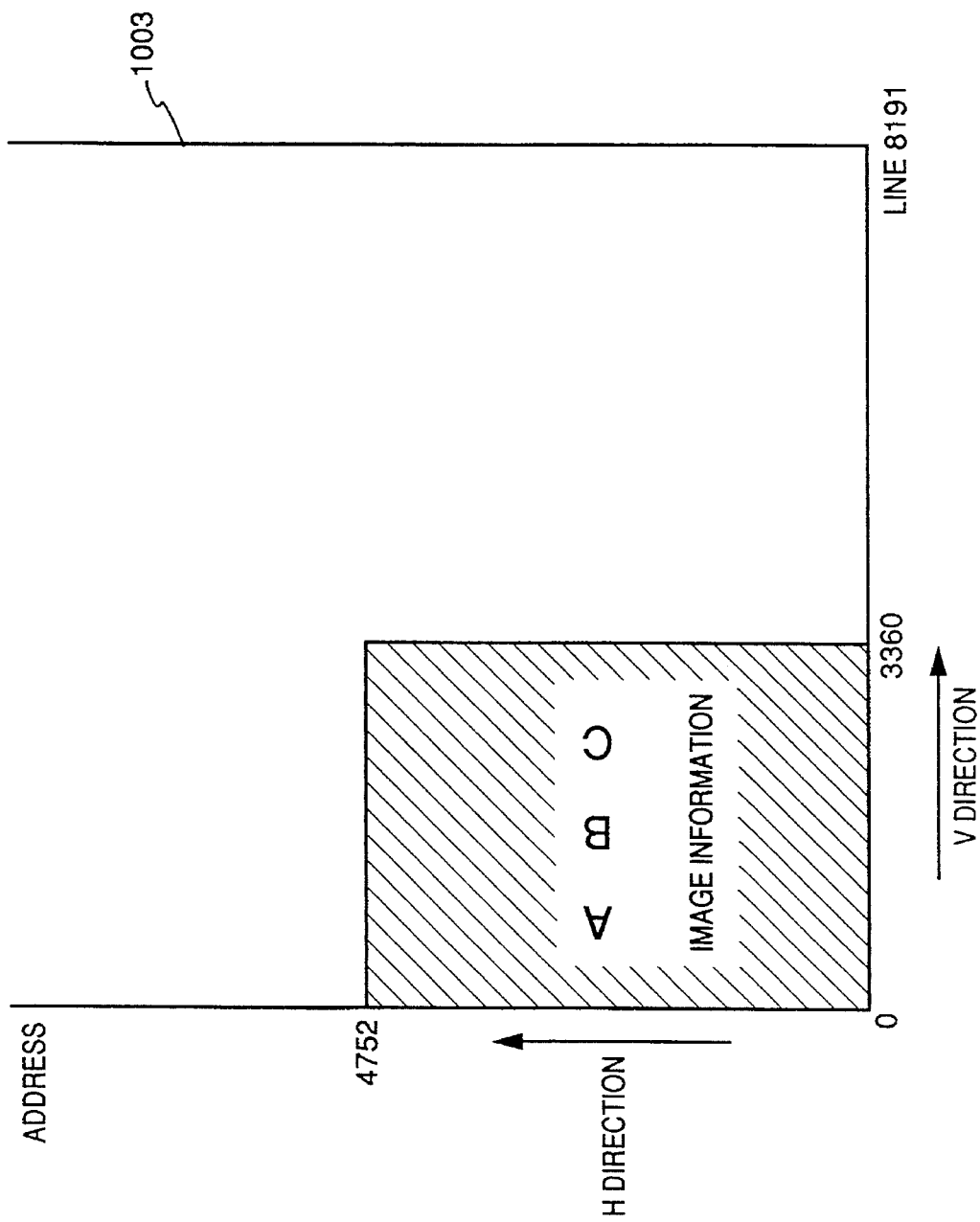
FIG. 17 is a diagram showing an address space of a memory in the embodiment.

FIG. 17 illustrates the address space of the memory 1003 in this embodiment.

As shown in FIG. 14, the outputs of counters 1006, 1007 each have 13 bits and these enter addresses A0–A12, A13–A25 of the memory 1003. Accordingly, the H direction corresponds to an address space of addresses 0 to 8191, and the V direction corresponds to an address space of line 0 to line 8191. In a case where the image information 2001 enters the memory space shown in FIG. 17 at the timing illustrated in FIG. 16, the area occupied is as indicated by the shaded portion in FIG. 17.

Here the image information 2001 is stored in the memory 1003 in conformity with the addresses of the original 999 shown in FIG. 15. That is, though image information of size A4 has been stored in the memory 1003, it is also possible to output the image information from the color reader 1 to the color printer 2 directly without storing it in the memory 1003.

Processing for reading the image information out of the memory 1003 of image memory device 3 will be described next.

Figure 18:
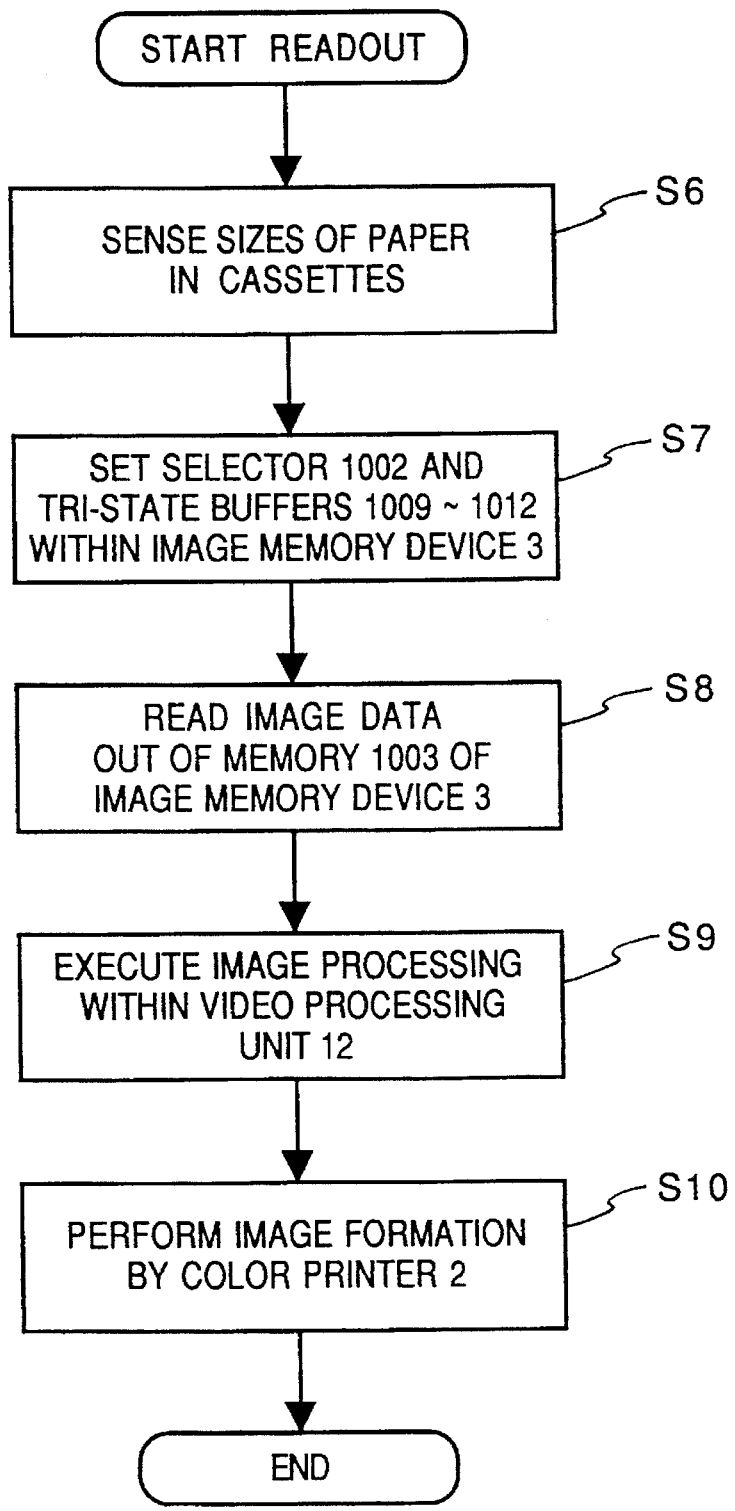
FIG. 18 is a flowchart for describing an image readout operation performed by a CPU in the image copying apparatus according to the embodiment.

FIG. 18 is a flowchart for describing an image readout operation performed by the CPU 1017 in the image copying apparatus according to the embodiment. At step S6 in FIG. 18, the types of paper that have been set in the paper feed cassettes 735, 736 of the color printer 2 are sensed. It will be assumed here that paper of types A4R, A3 have been loaded in the cassettes 735, 736, respectively.

Processing for forming an image on the A4R paper loaded in the upper cassette 735 will be described. (The recording density of image formation performed by the color printer 2 also is 16 dots/mm, just as in the case of the color reader 1.)

Figure 19:
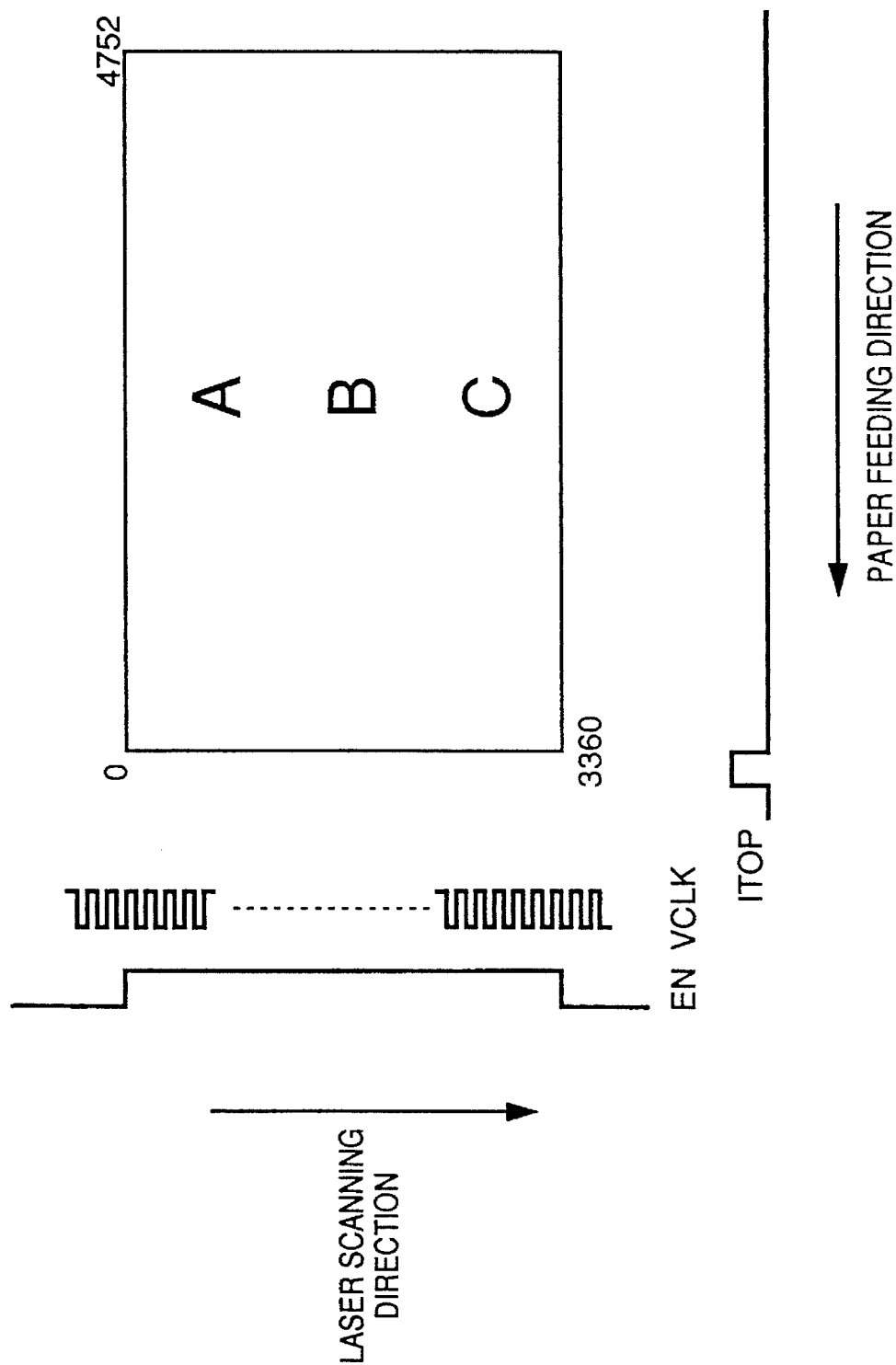
FIG. 19 is a diagram showing an example of output in a case where image information that has been stored in the memory is outputted on A4 paper in the embodiment.

FIG. 19 is a diagram showing an example of output in a case where image information that has been stored in the memory 1003 is outputted on the A4R paper in the embodiment. In a case where the image information is outputted on the A4R recording paper, the image information that has been stored in the memory 1003 is read out upon being rotated by 90°, as illustrated in FIG. 19.

The readout method through which this 90° rotation is performed will now be described.

First, prior to the 90° rotation, the video interface 201 of the color reader 1 is set as shown in FIG. 5, and the image information is transferred from the image memory device 3 toward the video processing unit 12. The CPU 1017 of the image memory device 3 controls the output port 1016, whereby the selector 1002 is set to the B side. Among the tri-state buffers 1009–1012, the tri-state buffers 1011, 1012 become effective and the tri-state buffers 1009, 1010 are placed in a state of high impedance (step 7 in FIG. 18).

The control unit 13 within the color reader 1 obtains, via the cable 511, the information indicative of the type of paper loaded in the paper-feed cassette 35 of the color printer 2. According to this embodiment, the A4R paper is set in the upper state. The video processing unit within the color reader 1 outputs the EN signal, VCLK and ITOP signal (FIG. 19) from this information at the time of image formation.

The ITOP signal is outputted when the A4R paper is fed, wound upon the transfer drum and has its leading edge sensed. Owing to detection of the laser beam from the laser output unit 711 (see FIG. 2), the EN signal goes to logical "0" only for the width portion of the A4R paper.

As for VCLK, a frequency corresponding to one pixel of the laser is outputted continuously. Since the recording density is 16 dots/mm, the number of VCLK pulses in the direction of laser scanning is 210 [mm]×16 [dots/mm]=3360 dots. The EN signal also goes to logical "0" during the time that 3360 clock pulses are entered. The control signal outputted from the video processing unit 12 and inputted to the image memory device 3 is fed into the counters 1006, 1007. The EN signal enters the clock input terminal of the counter 1006 and the clear terminal of the counter 1007. The VCLK signal enters the clock input terminal of the counter 1007, and the ITOP signal enters the clear terminal of the counter 1006.

Figure 20:
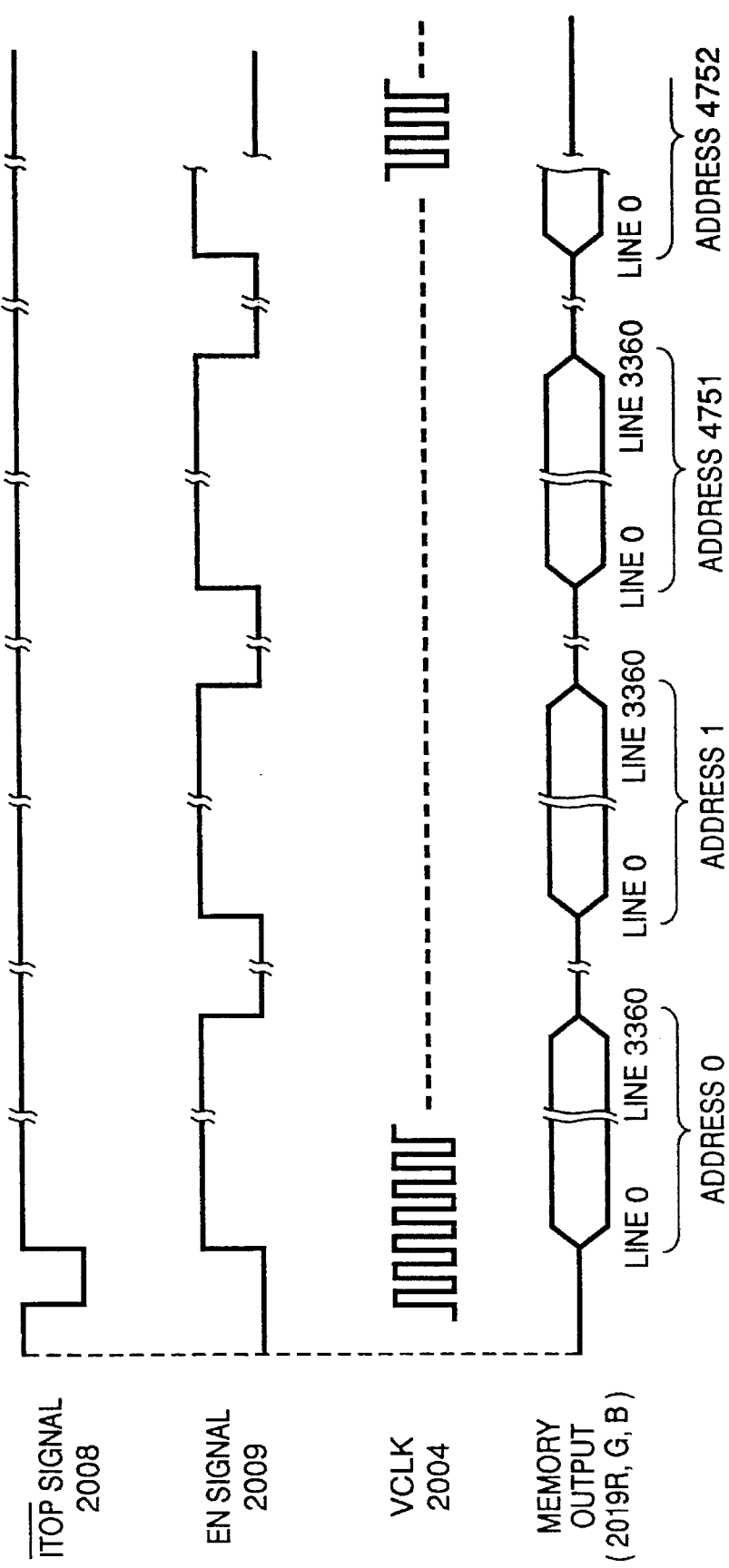
FIGS. 20 through 22 are timing charts of control signals in the image copying apparatus of the embodiment.

FIG. 20 is a timing chart of control signals in the image copying apparatus of the embodiment. When the EN signal 2009 shown in FIG. 20 is at logical "0", the counter 1007 is cleared and the counter output delivered on signal line 2012 is all "0"s. When the ITOP signal 2008 is at logical "0", the counter 1006 is cleared and the counter output delivered on signal line 2013 is all "0"s.

When VCLK 2004 enters the counter 1007 after the EN signal 2009 has risen to logical "1", the counter 1007 is counted up one pulse at a time and its output is outputted on signal line 2012. The counter output delivered on signal line 2012 enters the address terminals A13–A25 of the memory 1003 via the tri-state buffer 1011 that has been rendered effective. When the EN signal 2009 enters the counter 1006 after the ITOP signal has risen to logical "1", the counter 1006 is counted up one pulse at a time and its output is outputted on signal line 2016. The output of counter 1006 enters the address terminals A0–A13 of the memory 1003 via the tri-state buffer 1012 that has been rendered effective.

Thus, the fact that the output signal of counter 1006 enters the terminals A0–A12 of the memory and the output signal of counter 1007 enters the terminals A13–A25 of the memory indicates that the outputs of the counters 1006, 1007 have been interchanged from what they were at the time of the image reading operation described earlier.

Since the counter outputs are interchanged in the operation for reading out the image information shown in FIG. 17, first the information in the V direction of FIG. 17 is read and the output of counter 1006 for the H direction is counted up whenever one line is read, and then the next line in the V direction is read out.

The details of this processing are shown in FIG. 20. The outputs from the memory, namely the output signals delivered on the signal lines 2019R, G, B, are items of data obtained by reading out the data from line 0 to line 3360, in the V direction, at the 0 address in the H direction, and then reading out the data from line 0 to line 3360, in the V direction, at the 1 address in the H direction. By repeating this processing up to address 4752, the image information that was an original of size A4 can be rotated by 90° and read out of the memory 1003 in the A4R format.

Figure 21:
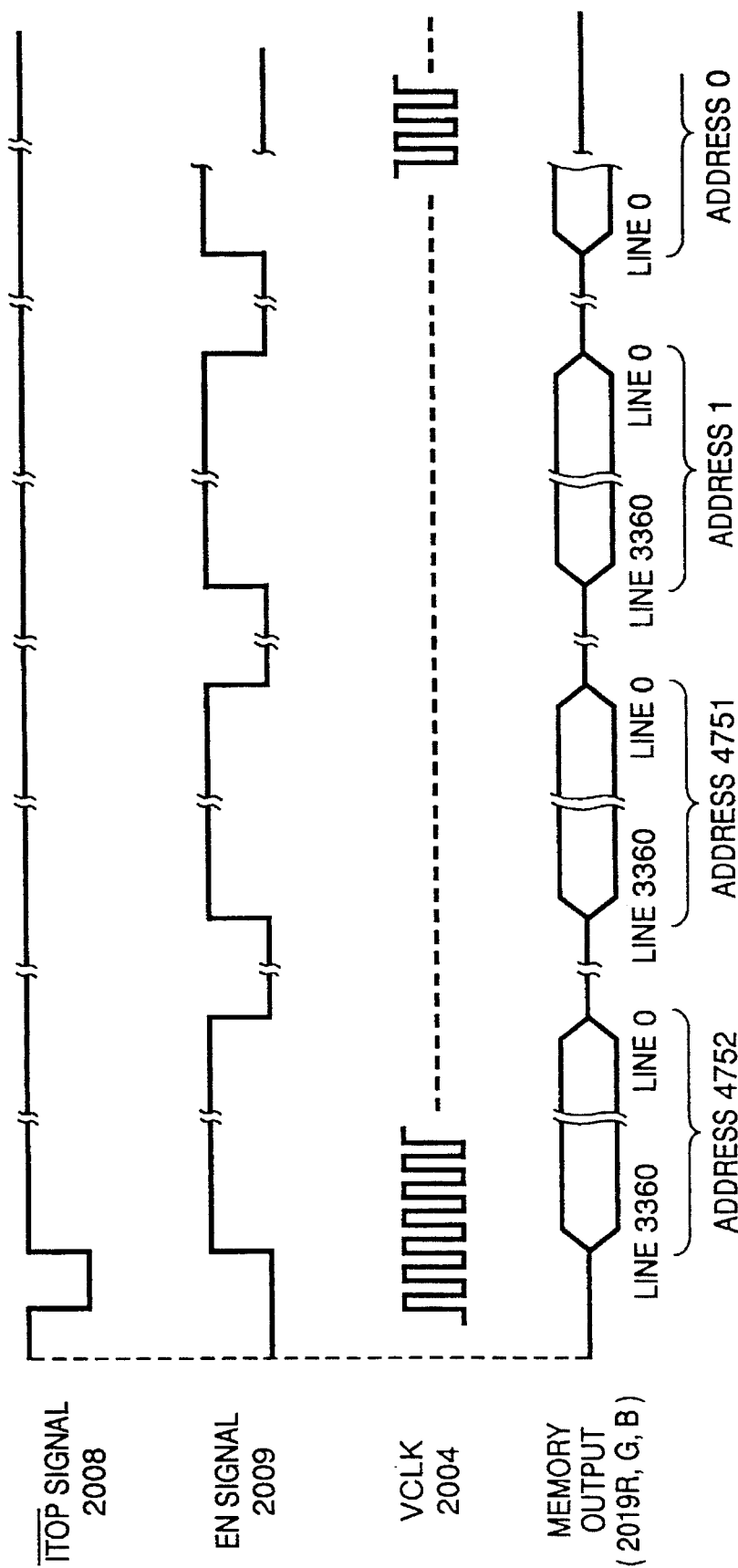

As shown in FIG. 21, the outputs from the memory, namely the output signals delivered on the signal lines 2019R, G, B, are items of data obtained by reading out the data in reverse manner from line 3350 to line 0, in the V direction, at the 4752 address in the H direction, and then reading out the data in reverse manner from line 3360 to line 0, in the V direction, at the 4751 address in the H direction. By repeating this operation up to address 0, the image information that was an original of size A4 can be rotated by 90° in the direction opposite that of FIG. 20 and read out of the memory 1003 in the A4R format.

Figure 22:
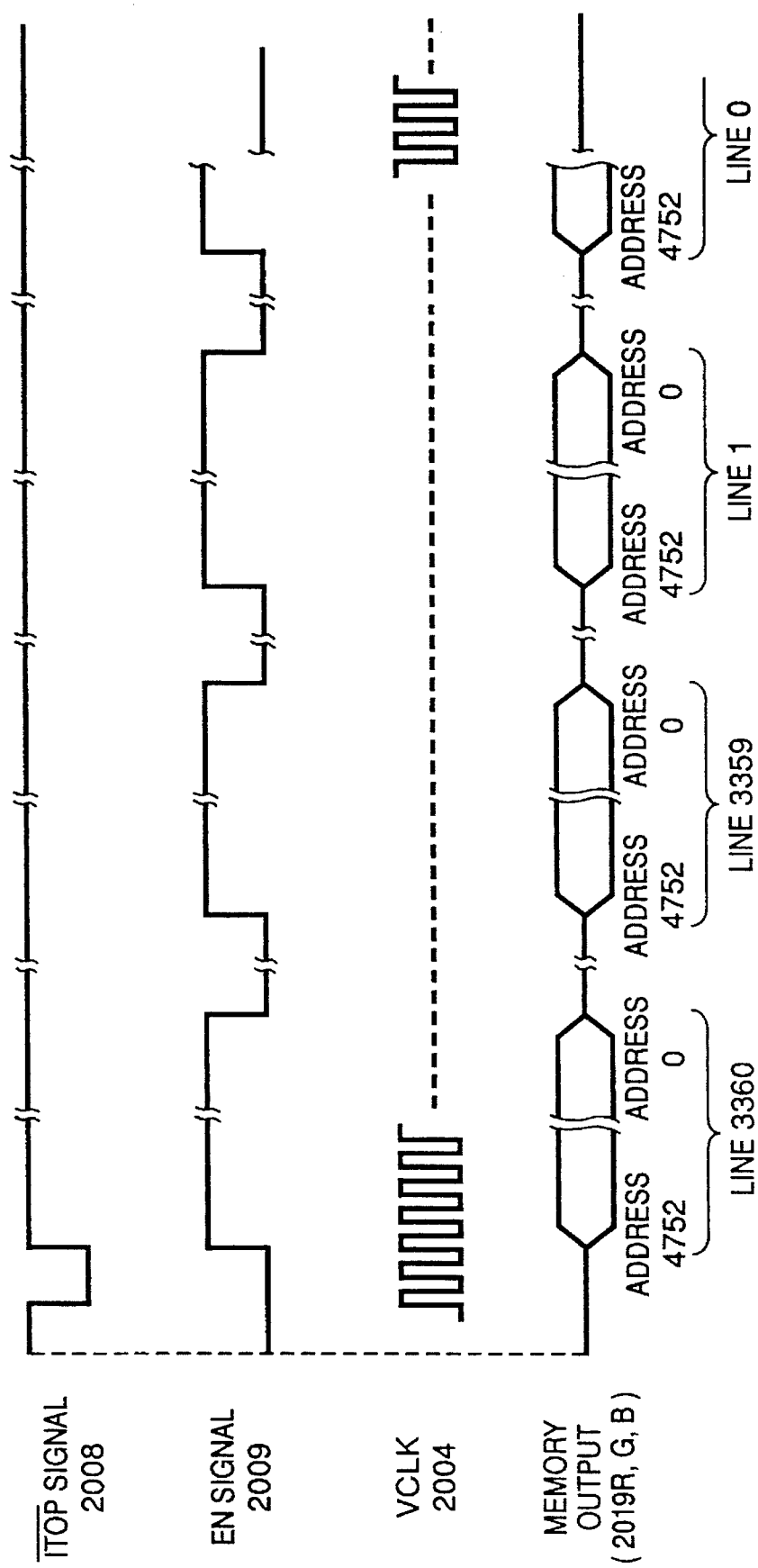

Further, in a case where the image information of the A4 original is outputted on size A4 paper upon being rotated 180°, the image is read out in a manner that is the opposite of that in which it was written, whereby the image can be made one rotated by 180°, as shown in FIG. 22. In other words, the signals outputted on the signal lines 2019R, G, B, are items of data obtained by reading out the data from address 4752 to address 0, in the H direction, at line 3360 in the V direction, and then reading out the data from address 4752 to address 0 line 3359 in the V direction. By repeatedly performing this operation up to line 0 in the V direction, image rotated by 180° can be read out as well (step S8 in FIG. 18).

The image information from the memory 1003 is outputted to the connector 1001 via the signal lines 2019R, 2019G, 2019B and through the selector 1002. This information is transmitted to the video interface 201 within the color reader 1 shown in FIG. 3. The image information that has been inputted to the video interface 201 is subjected to processing by the color converting circuit 47, LOG circuit 48, color correcting circuit 49, black-character processing circuit 69, density converting circuit 116, zoom circuit 117 and repeating circuit 118, after which the resulting information is outputted via the printer interface 56 so that an image is formed by the color printer 2.

The image information sent from the color reader 1 enters a PWM circuit 778 (see FIG. 2) within the color printer 2. The PWM circuit 778 binarizes the multivalued image information by pulse-width modulation, and the binarized image information is sent to the laser output unit 711. The laser beam emitted by the laser output unit 711 is reflected by the polygon mirror 712 and is made to linearly scan the surface of the photosensitive drum 715 by the f/θ lens 713 and reflecting mirror 714, whereby a latent image corresponding to the information in the memory 1003 is formed (step S10 in FIG. 18).

Processing from step S10 onward is the same as that set forth in connection with the color printer 2 above and need not be described again.

<Description of Direction of Rotation at Time of Double-sided Copying>

Figure 23:
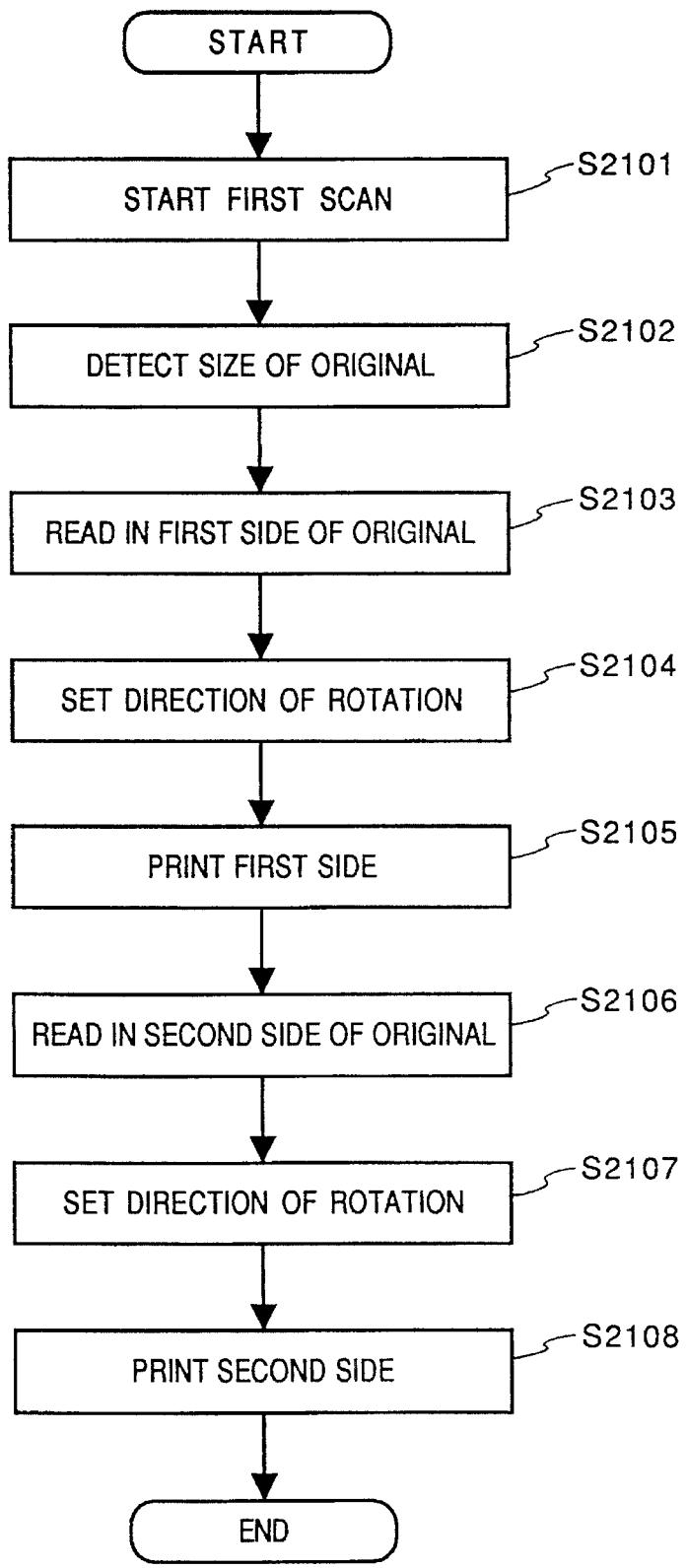
FIG. 23 is a flowchart showing the operation, which prevails at the time of double-sided copying, performed by a CPU within the control unit of the image copying apparatus according to the embodiment.

FIG. 23 is a flowchart showing the operation, which prevails at the time of double-sided copying, performed by the CPU 22 within the control unit 13 of the image copying apparatus according to this embodiment. As shown in FIG. 23, the original 999 is scanned by the original scanning unit 11 in a first scan (step S2101), and the size of the original is detected by the CPU 22 within the control unit 13. The detected size of the original is stored in the RAM 23. The information indicative of the size of the original is sent also to the video interface 201 via the communication line 501 shown in FIG. 1. The information indicative of the size of the original is outputted as the reading area as in the processing of step S3 in FIG. 13 described earlier. Next, the reading of the first side of the original at step S2103 starts. After the read original has been stored in the image memory, the setting of the direction of rotation at the time of readout is performed at step S2014. The details of this operation for setting the direction of rotation are illustrated in FIG. 24.

Figure 24:
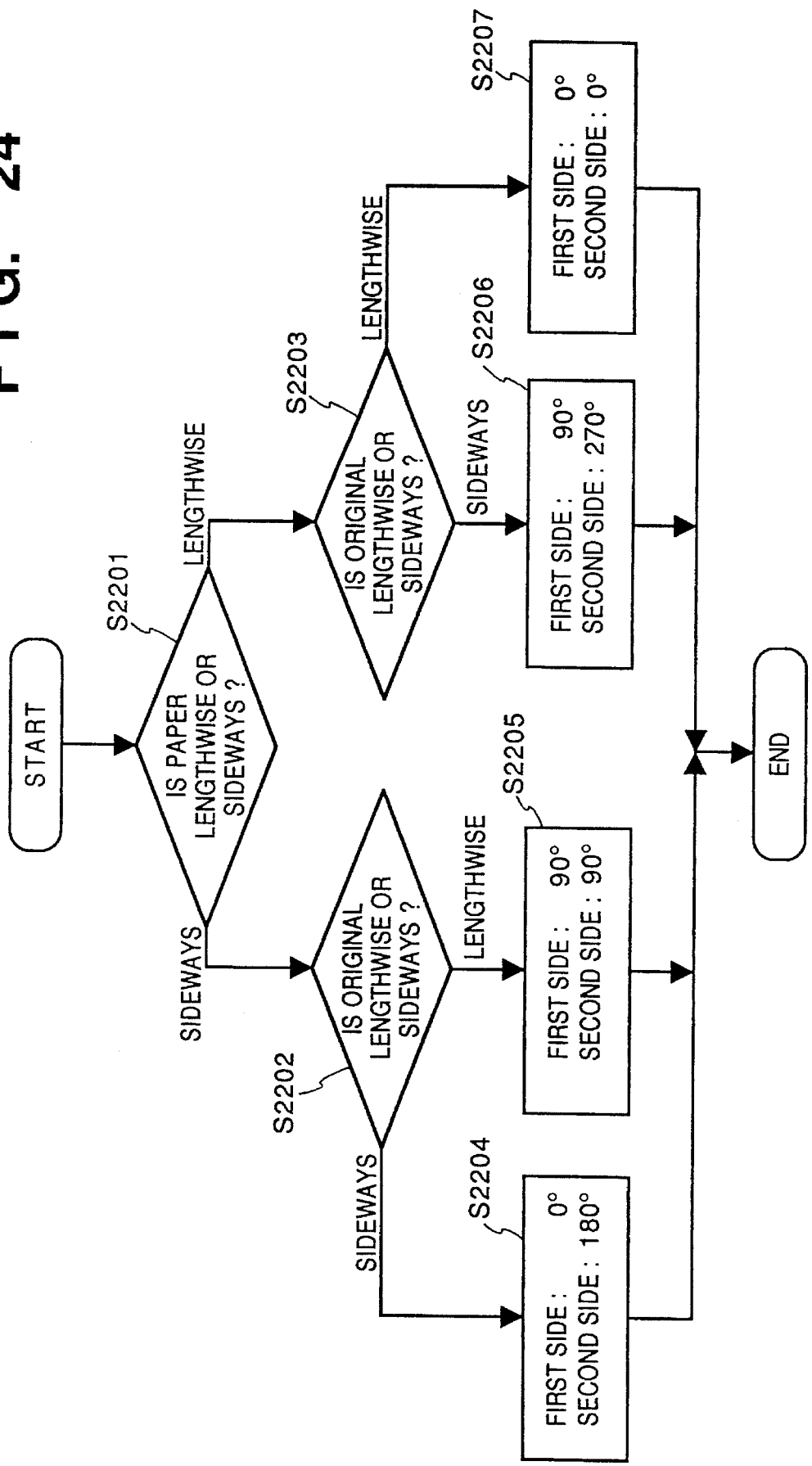
FIG. 24 is a detailed flowchart regarding the setting of direction of rotation when readout is performed in the embodiment.

In the flowchart of FIG. 24, it is determined whether the selected paper is arranged lengthwise or sideways (step S2201). The program proceeds to step S2202 if the paper is arranged sideways and to step S2203 if the paper is arranged lengthwise. It is determined at each of steps S2202, S2203 whether the original has been set lengthwise or sideways. The program proceeds to step S2204 if the original is found to be set sideways at step S2202 and to step S2205 if the original is found to be set lengthwise at step S2202.

On the other hand, the program proceeds to step S2206 if the original is found to be set sideways at step S2203 and to step S2207 if the original is found to be set lengthwise at step S2203. These processing operations are performed as described and the selector 1002 and tri-state buffers 1009–1012 within the image memory device 3 are set accordingly.

At step S2105 in FIG. 23, the image information is read out of the image memory 1003 and printing processing is executed in the manner described above. After the first side of the image has been printed at step S2105, reading in of the second side of the original begins at step S2106 and this is written in the image memory 1003. Next, the setting of the direction of rotation is performed at step S2107 in the same manner as the setting operation at step S2104. Then, at step S2108, the paper on which the image of the first side has been formed is passed through the double-side path 752, and the image of the second side is formed on the back side of this paper at the prescribed timing, after which the paper is ejected from the machine.

In a case where copies are bound lengthwise, the arrangement according to this embodiment is such that copying is performed on both sides without contradiction. However, the invention is not limited to this arrangement. For example, in a case where the copies are bound widthwise, this can be realized with ease by changing the setting of the direction of rotation at steps S2204–S2207 in FIG. 24.

In accordance with the present embodiment, as described above, the size and orientation of the original as well as the type and orientation of the paper outputted are discriminated and the angles of rotation of the images of the first and second sides at the time of double-sided copying are decided, thereby making it possible to perform normal double-sided copying irrespective of how the original is placed upon the platen.

[Modification 1]

A first modification of the foregoing embodiment will now be described. The structure of the image copying apparatus according to this modification, as well as the configuration of the control circuitry, is similar to that of the image copying apparatus according to the foregoing embodiment and need not be described again.

In the foregoing embodiment, a case is described in which the copies are bound lengthwise or widthwise irrespective of the size of the paper on which copying is performed. In this modification, however, the direction in which the image is rotated is decided upon taking the size of the paper into consideration.

Figure 25:
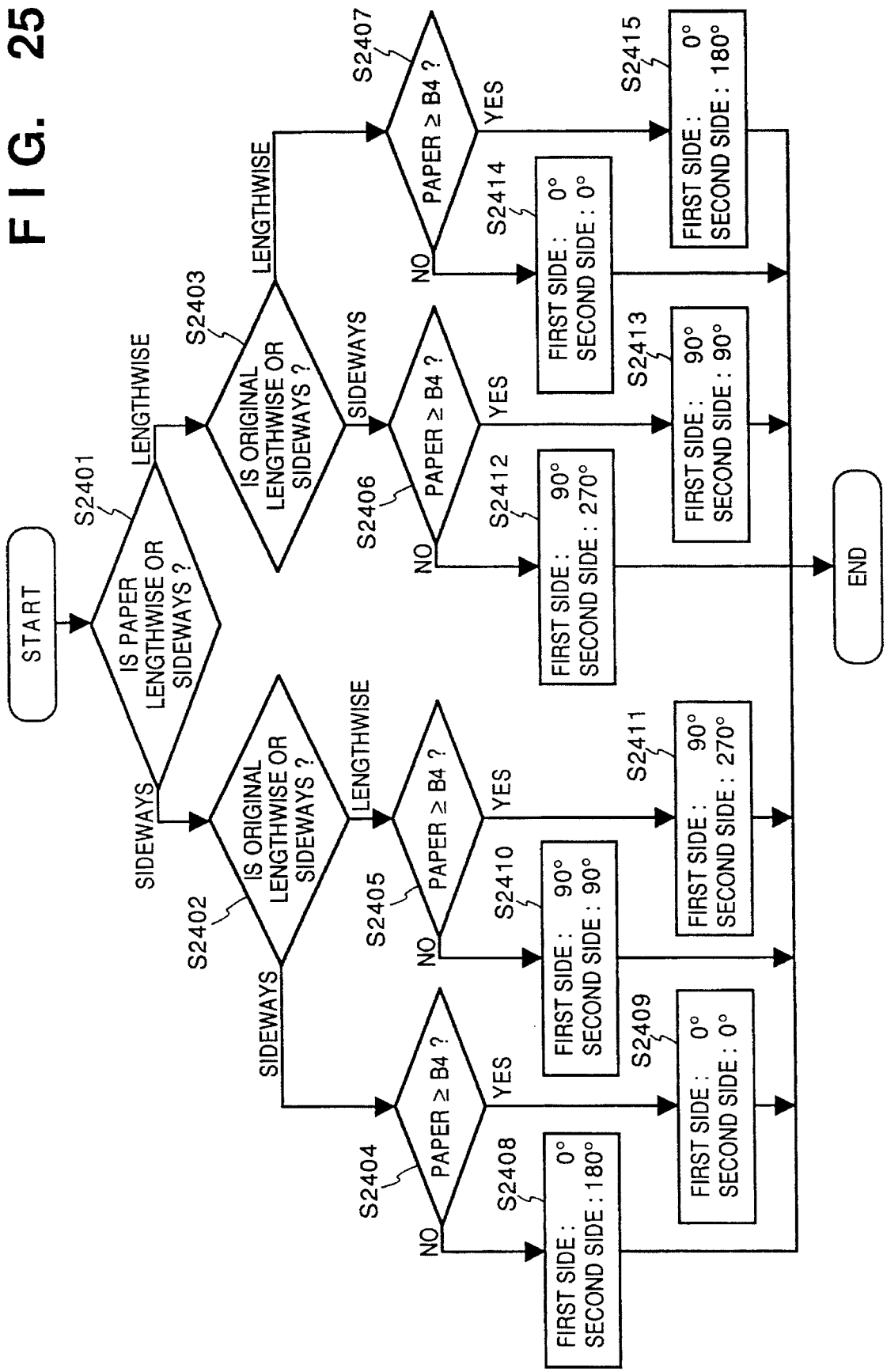
FIG. 25 is a flowchart showing a procedure for setting direction of rotation when double-sided copying is performed in a first modification.

FIG. 25 is a flowchart showing a procedure for setting direction of rotation when double-sided copying is performed in accordance with the first modification. In the flowchart, it is determined at step S2401 whether the selected paper is arranged sideways or lengthwise. The program proceeds to step S2403 if the paper is arranged sideways and to step S2402 if the paper is arranged lengthwise. It is determined at each of steps S2402, S2403 whether the original has been set sideways or lengthwise.

The program proceeds to step S2404 if the original is found to be set sideways at step S2402 and to step S2405 if the original is found to be set lengthwise at step S2402. The program proceeds to step S2406 if the original is found to be set sideways at step S2403 and to step S2407 if the original is found to be set lengthwise at step S2403. At each of steps S2404–S2407, it is determined whether the size of the paper on which copying is to be performed is equal to or greater than size B4 or less than size B4.

The program proceeds to step S2408 if the decision rendered at step S2404 is that the paper size is less than B4 and to step S2409 if the decision rendered at step S2405 is that the paper size is equal to or greater than B4. Further, the program proceeds to step S2410 if the decision rendered at step S2405 is that the paper size is less than B4 and to step S2411 if the decision rendered at step S2405 is that the paper size is equal to or greater than B4.

The program proceeds to step S2412 if the paper size is found to be less than B4 at decision of step S2406 and to step S2413 if the paper size is found to be equal to or greater than B4 at decision of step S2406. Further, the program proceeds to step S2414 if the paper size is found to be less than B4 at decision of step S2407 and to step S2415 if the paper size is found to be equal to or greater than B4 at decision of step S2407. As a result, the setting of the direction of rotation for each of the first and second sides is carried out.

Thus, the angle of rotation of the image is decided upon taking the size of the paper outputted into consideration, irrespective of the lengthwise or sideways direction of the original and outputted paper. This makes it possible to carry out double-sided copying more normally.

[Modification 2]

A second modification of the foregoing embodiment will now be described. The structure of the image copying apparatus according to this modification, as well as the configuration of the control circuitry, is similar to that of the image copying apparatus according to the foregoing embodiment and need not be described again.

In this modification, as shown in FIG. 27, the direction in which the image is rotated is decided by taking into consideration (a), namely a case in which copies are to be bound lengthwise, and (b), namely a case in which copies are bound widthwise.

Figure 26:
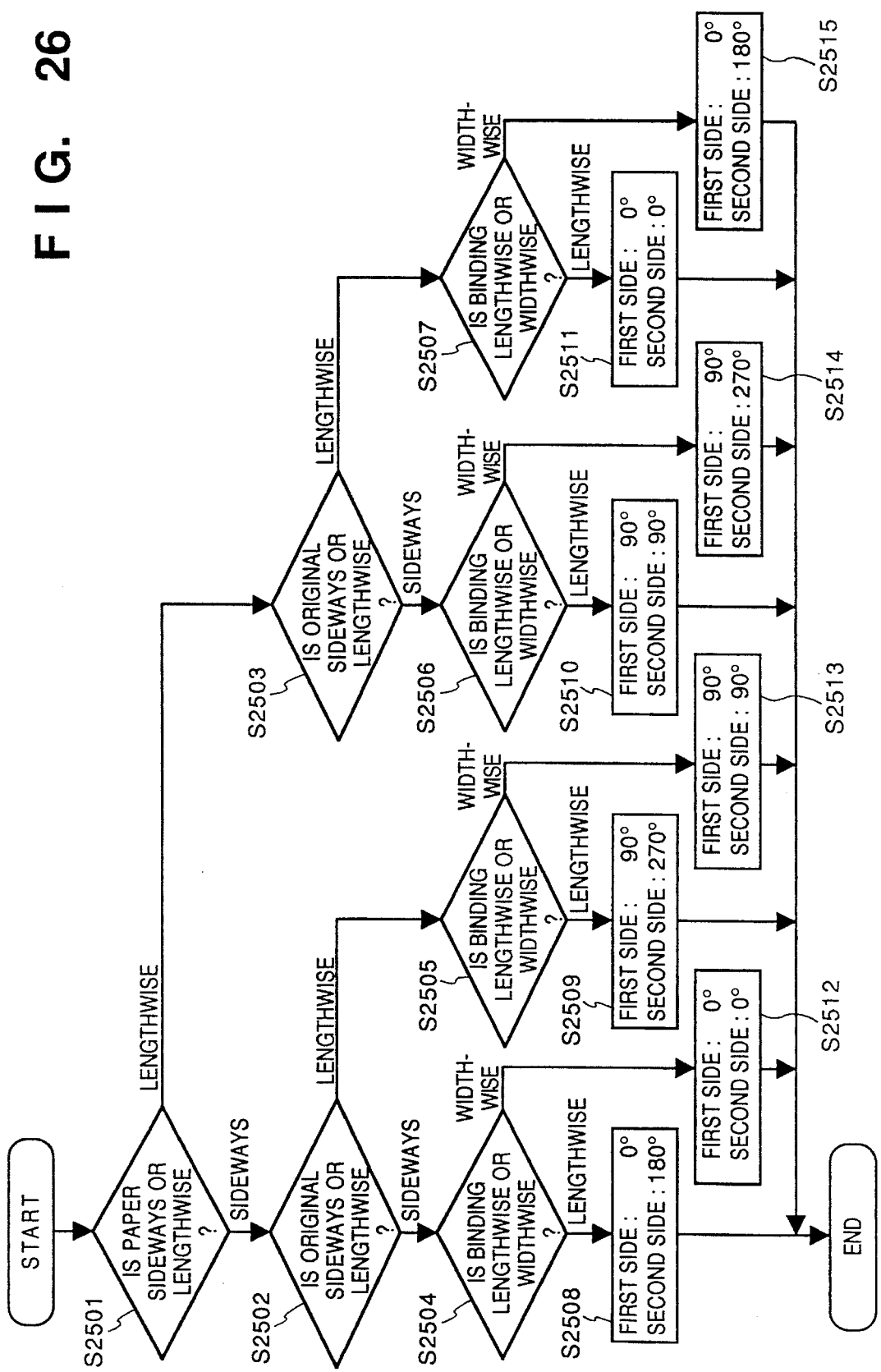
FIG. 26 is a flowchart showing a procedure for setting direction of rotation when double-sided copying is performed in a second modification.

A procedure for setting the direction of rotation at the time of double-sided copying in this modification will be described in accordance with the flowchart shown in FIG. 26.

In the flowchart, it is determined at step S2501 whether the selected paper is arranged sideways or lengthwise. The program proceeds to step S2502 if the paper is arranged sideways and to step S2503 if the paper is arranged lengthwise. It is determined at each of steps S2502, S2503 whether the original has been set sideways or lengthwise.

Figure 27A:
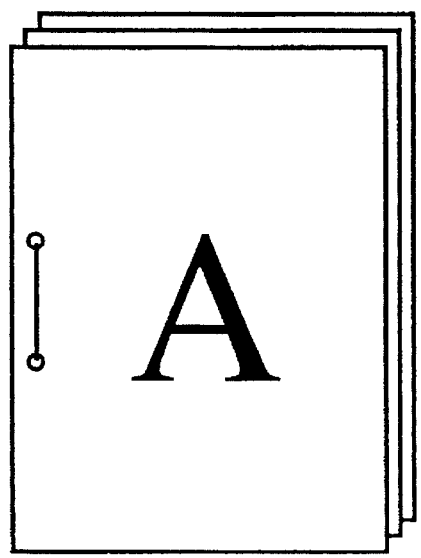
FIGS. 27A and 27B are diagrams showing methods of binding in the second modification.
Figure 27B:
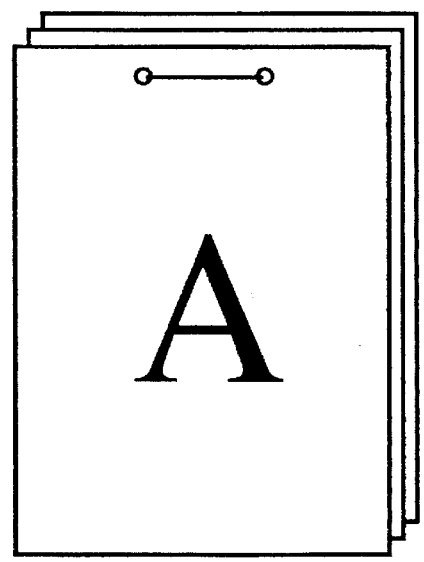
Figure 28A:
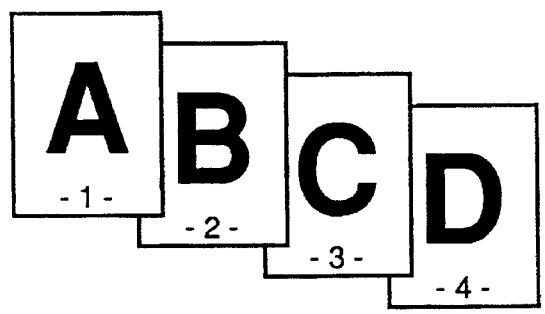
FIGS. 28A through 28E are diagrams showing copying states in an image copying apparatus according to the prior art.
Figure 28B:
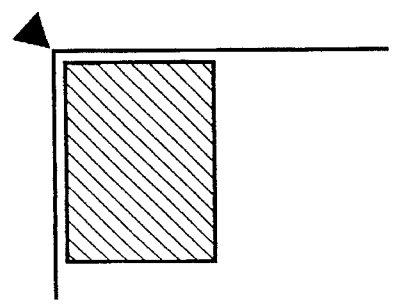
Figure 28C:
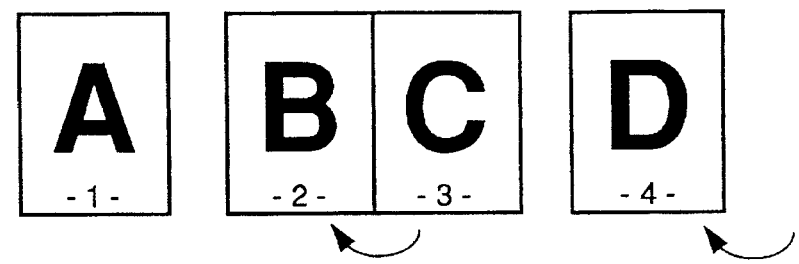
Figure 28D:
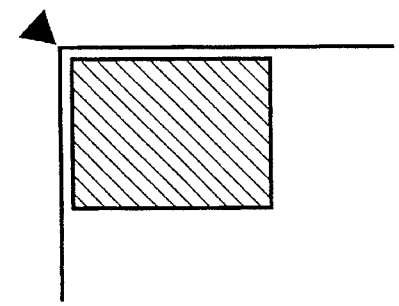
Figure 28E:
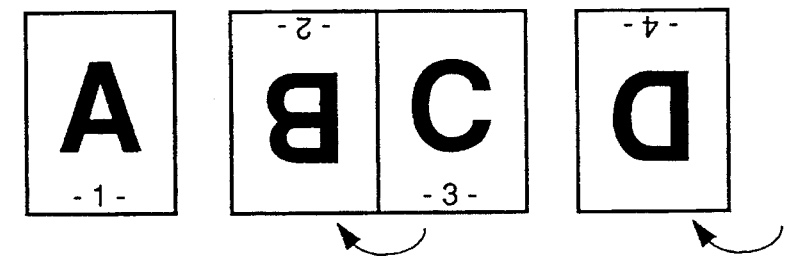

The program proceeds to step S2504 if the original is found to be set sideways at step S2502 and to step S2505 if the original is found to be set lengthwise at step S2502. On the other hand, the program proceeds to step S2506 if the original is found to be set sideways at step S2503 and to step S2507 if the original is found to be set lengthwise at step S2503. At each of steps S2504, S2505, S2506 and S2507, it is determined whether the binding direction is along the lengthwise direction or along the widthwise direction. This determination is made based upon a mode set by a binding-direction setting key, which sets the binding directions shown in FIG. 27A and 27B, provided on the control panel 20 of the image forming apparatus according to the embodiment illustrated in FIG. 1.

The program proceeds to step S2508 if the binding direction is determined to be lengthwise at step S2504 and to step S2512 if the binding direction is determined to be widthwise. The program proceeds to step S2509 if the binding direction is determined to be lengthwise at step S2505 and to step S2513 if the binding direction is determined to be widthwise. Similarly, the program proceeds to step S2510 if the binding direction is determined to be lengthwise at step S2506 and to step S2514 if the binding direction is determined to be widthwise. Furthermore, the program proceeds to step S2511 if the binding direction is determined to be lengthwise at step S2507 and to step S2515 if the binding direction is determined to be widthwise. The direction of rotation is set accordingly at steps S2512–S2515.

Thus, double-sided copying can be carried out in a normal state by deciding the angle of rotation of the image upon taking the binding direction of the outputted copies into consideration.

The present invention can be applied to a system constituted by a plurality of devices or to an apparatus comprising a single device.

As many apparently widely different embodiments of the present invention can be made without departing from the spirit and scope thereof, it is to be understood that the invention is not limited to the specific embodiments thereof except as defined in the appended claims.

What is claimed is:

1. An image copying apparatus comprising:
   discriminating means for discriminating a direction at which one or more original(s) have been placed on a scanner, the scanner providing first and second original images with a relative orientation therebetween from the original(s);

deciding means for deciding a first angle of rotation of the first original image, and for deciding a second angle of rotation of the second original image; and image forming means for forming the first original image onto a first face of a recording paper at the first angle of rotation, and for forming the second original image onto a second face of the recording paper at the second angle of rotation, wherein said deciding means decides the first and second angles of rotation based upon the discriminated direction of the original(s) and based upon whether the first original image or the second original image is to be formed, so that a relative orientation between the first and second original images formed onto the first and second faces of the recording paper, respectively, is the same as the relative orientation between the first and second original images irrespective of the direction of the original(s) and regardless of how the recording paper is handled by said image forming means.

2. The apparatus according to claim 1, further comprising detecting means for detecting a paper direction in which a recording paper has been set, wherein said deciding means selects 0° as the first and the second angles of rotation in a case where both the direction at which the original(s) have been placed on the scanner and the paper direction are lengthwise.

3. The apparatus according to claim 1, further comprising detecting means for detecting a paper direction in which a recording paper has been set, wherein said deciding means selects 0° as the first angle of rotation of the first original image and 180° as the second angle of rotation of the second original image in a case where both the direction at which the original(s) have been placed on the scanner and the paper direction are sideways.

4. The apparatus according to claim 1, further comprising detecting means for detecting a paper direction in which a recording paper has been set, wherein said deciding means selects 90° as the first angle of rotation of the first original image and 270° as the second angle of rotation of the second original image in a case where the direction at which the original(s) have been placed on the scanner is sideways and the paper direction is lengthwise.

5. The apparatus according to claim 1, further comprising detecting means for detecting a paper direction in which a recording paper has been set, wherein said deciding means selects 90° as the first and second angles of rotation of the first and the second original images, respectively, in a case where the direction at which the original(s) have been placed on the scanner is lengthwise and the paper direction is sideways.

6. The apparatus according to claim 1, further comprising a memory functionally connected to said image forming means for storing the first or the second original image, and means for accessing said memory in an order which corresponds to one of the first and second angles of rotation decided by said deciding means.

7. The apparatus according to claim 6, further comprising detecting means for detecting a paper direction in which a recording paper has been set, wherein said apparatus forms an image without using said memory if the direction at which the original(s) have been placed on the scanner and the paper direction coincide.

8. The apparatus according to claim 1, further comprising read-out means for reading out the original image by scanning thereof, wherein said apparatus detects the direction at which the original(s) have been placed on the scanner by a pre-scanning performed by said read-out means.

9. The apparatus according to claim 1, wherein said image forming means forms an image by an electro-static recording method.

10. The apparatus according to claim 1, further comprising means for generating a pulse-width modulated signal having a pulse-width which corresponds to a pixel density, and said image forming means comprises means for emitting light based upon said pulse-width modulated signal.

11. The apparatus according to claim 1, wherein said apparatus forms a color image.

12. The apparatus according to claim 1, wherein the first and second original images are on respective first and second faces of a single original.

13. The apparatus according to claim 1, wherein the first and second original images are on a first face of respective first and second originals.

14. The apparatus according to claim 1, wherein when the original(s) have been placed on the scanner such that an upper portion of the original(s) contacts a prescribed position of the scanner, said deciding means decides the first and second angles of rotation based upon the discriminated direction of the original(s) and whether the first original image or the second original image is to be formed, so that upper portions of the first and second original images formed onto the first and second faces of the recording paper, respectively, are positioned on a same portion of the recording paper, irrespective of the direction of the original(s) and regardless of whether the recording paper has been fed width-wisely or length-wisely.

15. The apparatus according to claim 1, further comprising:

means for detecting a direction in which the recording paper has been set; and means for setting a binding direction of the recording paper, wherein said deciding means selects one from 0°, 90°, 180° and 270° as the first and second angles of rotation further based upon the set binding direction of the recording paper.

16. The apparatus according to claim 15, wherein said deciding means selects 0° as the first and second angles of rotation of the first and the second original images, respectively, in a case where both the direction at which the original(s) have been placed on the scanner and the paper directions are lengthwise and the set binding direction of the recording paper is lengthwise.

17. The apparatus according to claim 15, wherein said apparatus forms a color image.

18. The apparatus according to claim 15, further comprising a memory functionally connected to said image forming means for storing the first or the second original image, and means for accessing said memory in an order which corresponds to one of the first and second angles or rotation decided by said deciding means.

19. The apparatus according to claim 18, wherein said apparatus forms an image without using said memory if the direction at which the originals have been placed on the scanner and the paper direction coincide.

20. The apparatus according to claim 15, wherein said deciding means selects 0° as the first angle of rotation of the first original image and 180° as the second angle of rotation of the second original image in a case where both the direction at which the original(s) have been placed on the scanner and the paper direction are lengthwise, and the set binding direction of the recording paper is widthwise.

21. The apparatus according to claim 15, wherein said deciding means selects 0° as the first and second angles of rotation of the first and the second original images, respectively, in a case where both the direction at which the original(s) have been placed on the scanner and the paper direction are sideways, and the set binding direction of the recording paper is widthwise.

22. The apparatus according to claim 15, wherein said deciding means selects 0° as the first angle of rotation of the first original image and 180° as the second angle of rotation of the second original image in a case where both the direction at which the original(s) have been placed on the scanner and the paper direction are sideways, and the set binding direction of the recording paper is lengthwise.

23. The apparatus according to claim 15, wherein said deciding means selects 90° as the first and second angles of rotation of the first and the second original images, respectively, in a case where the direction at which the original(s) have been placed on the scanner is sideways and the paper direction is lengthwise, and the set binding direction of the recording paper is lengthwise.

24. The apparatus according to claim 15, wherein said deciding means selects 90° as the first angle of rotation of the first original image and 270° as the second angle of rotation of the second original image in a case where the direction at which the original(s) have been placed on the scanner is sideways and the paper direction is lengthwise, and the set binding direction of the recording paper is widthwise.

25. The apparatus according to claim 15, wherein said deciding means selects 90° as the first and second angles of rotation of the first and the second original images, respectively, in a case where the direction at which the original(s) have been placed on the scanner is lengthwise and the paper direction is sideways, and the set binding direction of the recording paper is widthwise.

26. The apparatus according to claim 15, wherein said deciding means selects 90° as the first angle of rotation of the first original image and 270° as the second angle of rotation of the second original image in a case where the direction at which the original(s) have been placed on the scanner is lengthwise, and the paper direction is sideways, and the set binding direction of the recording paper is lengthwise.

27. The apparatus according to claim 15, further comprising read-out means for reading out the original image by scanning thereof, wherein said apparatus discriminates the direction at which the originals) have been placed on the scanner by a pre-scanning performed by said read-out means.

28. The apparatus according to claim 15, wherein said image forming means forms an image by an electro-static recording method.

29. The apparatus according to claim 28, further comprising means for generating a pulse-width modulated signal having a pulse-width which corresponds to a pixel density, and said image forming means comprises means for emitting light based upon said pulse-width modulated signal.

30. An image copying apparatus comprising:

a scanner which includes a scanning surface and which generates first and second original images from one or more original(s) placed on the scanning surface, said scanner defining a prescribed position on the scanning surface against which the original(s) may be placed width-wisely or length-wisely;

first detecting means for detecting whether the original(s) have been placed width-wisely or length-wisely at the prescribed position and for generating a placement direction signal in accordance with the detection;

feed means for feeding a recording paper to an image forming station, said feed means including second detecting means for detecting whether the recording paper is fed width-wisely or length-wisely and for generating a paper direction signal in accordance with the detection;

image forming means arranged at the image forming station for forming the first original image in accordance with a first scanning of the original(s) by said scanner on a first face of the recording paper, and for forming a second original image in accordance with a second scanning of the original(s) by said scanner on a second face of the recording paper; and deciding means for deciding first and second angles of rotation for rotating the first and second original images, respectively, said deciding means rotating the first and second original images based on the placement direction signal and the paper direction signal and based on whether the first original image or the second original image is to be formed, such that the first original image and the second original image are recorded on respective first and second faces of the recording paper such that a relative orientation between the first and second original images recorded on the first and second faces of the recording paper, respectively, is the same as the relative orientation between the first and second original images, irrespective of whether the original(s) have been placed width-wisely or length-wisely at the prescribed position, irrespective of whether the recording paper has been fed width-wisely or length-wisely, and regardless of how the recording paper is handled by said image forming means.

31. The apparatus according to claim 30, wherein the first and second original images are on respective first and second faces of a single original.

32. The apparatus according to claim 30, wherein the first and second original images are on a first face of respective first and second originals.

33. An image copying apparatus according to claim 4, further comprising:

means for detecting a direction in which the recording paper has been set; and means for detecting a size of the recording paper, wherein said deciding means selects one from among 0°, 90°, 180° and 270° as the first and second angles of rotation further based upon the detected size of the recording paper.

34. The apparatus according to claim 33, wherein said deciding means selects 0° as the first and second angles of rotation of the first and the second original images, respectively, in a case where both the direction at which the original(s) have been placed on the scanner and the paper direction are lengthwise and the detected size of the recording paper is less than a predetermined size.

35. The apparatus according to claim 33, wherein said deciding means selects 0° as the first angle of rotation of the first original image and 180° as the second angle of rotation of the second original image in a case where both the direction at which the original(s) have been placed on the scanner and the paper direction are lengthwise and the detected size of the recording paper is greater than a predetermined size.

36. The apparatus according to claim 33, wherein said deciding means selects 0° as the first and second angles of rotation of the first and the second original images, respectively, in a case where both the direction at which the original(s) have been placed on the scanner and the paper direction are sideways and the detected size of the recording paper is greater than a predetermined size.

37. The apparatus according to claim 33, wherein said deciding means selects 0° as the first angle of rotation of the first original image and selects 180° as the second angle of rotation of the second original image in a case where both the direction at which the originals have been placed on the scanner and the paper direction are sideways and the detected size of the recording paper is less than a predetermined size.

38. The apparatus according to claim 33, wherein said deciding means selects 90° as the first angle of rotation of the first original image and 270° as the second angle of rotation of the second original image in a case where the direction at which the original(s) have been placed on the scanner is sideways and the paper direction is lengthwise, and the detected size of the recording paper is less than a predetermined size.

39. The apparatus according to claim 33, wherein said deciding means selects 90° as the first and second angles of rotation of the first and the second original images, respectively, in a case where the direction at which the original(s) have been placed on the scanner is sideways and the paper direction is lengthwise, and the detected size of the recording paper is greater than a predetermined size.

40. The apparatus according to claim 33, wherein said deciding means selects 90° as the first angle of rotation of the first original image and 270° as the second angle of rotation of the second original image in a case where the direction at which the original(s) have been placed on the scanner is lengthwise and the paper direction is sideways, and the detected size of the recording paper is greater than a predetermined size.

41. The apparatus according to claim 33, wherein said deciding means selects 90° as the first and second angles of rotation of the first and the second original images, respectively, in a case where the direction at which the original(s) have been placed on the scanner is lengthwise and the paper direction is sideways, and the detected size of the recording paper is less than a predetermined size.

42. An image copying method, comprising the steps of:
(a) discriminating a direction at which one or more original(s) have been placed on a scanner, the scanner providing first and second original images with a relative orientation therebetween from the original(s);
(b) deciding a first angle of rotation of the first original image, and a second angle of rotation of the second original image; and
(c) forming the first original image onto a first face of a recording paper at the first angle of rotation, and forming the second original image onto a second face of the recording paper at the second angle of rotation,
wherein in said step of deciding, the first and second angles of rotation are decided based upon the direction of the original(s) and based upon whether the first original image or the second original image is to be formed, so that a relative orientation between the first and second original images formed onto the first and second faces of the recording paper, respectively, is the same as the relative orientation between the first and second original images, irrespective of the direction of the original(s) and regardless of how the recording paper is handled in said forming step.

43. The method according to claim 42, wherein when the original(s) have been placed on the scanner such that an upper portion of the original(s) contacts a prescribed position of the scanner, said deciding step decides the first and second angles of rotation based upon the discriminated direction of the original(s) and whether the first original image or the second original image is to be formed, so that upper portions of the first and second original images formed onto the first and second faces of the recording paper, respectively, are positioned on a same portion of the recording paper, irrespective of the direction of the original(s) and regardless of whether the recording paper has been fed width-wisely or length-wisely.

44. The method according to claim 42, further comprising the step of determining a size of the recording paper, wherein in said step of deciding, one from among 0°, 90°, 180° and 270° is selected as one of the first and second angles of rotation further based upon the detected size of the recording paper.

45. The method according to claim 42, further comprising the step of setting a binding direction of the recording paper, wherein in said step of deciding, one from among 0°, 90°, 180° and 270° is selected as one of the first and second angles of rotation further based upon the set binding direction of the recording paper.

46. The method according to claim 42, further comprising the steps of:
(d) storing the first or the second original image in a memory; and
(e) accessing said memory in an order which corresponds to one of the first and second angles of rotation decided in said step of deciding.

47. The method according to claim 42, wherein an image is formed by an electro-static recording method in said step of forming.

48. The method according to claim 42, wherein a color image is formed by said method.

49. The method according to claim 42, wherein the first and second original images are on respective first and second faces of a single original.

50. The method according to claim 42, wherein the first and second original images are on a first face of respective first and second originals.

* * * * *